United States Patent
Min et al.

(10) Patent No.: US 12,174,523 B2
(45) Date of Patent: Dec. 24, 2024

(54) CAMERA MODULE AND OPTICAL DEVICE COMPRISING SAME

(71) Applicant: LG INNOTEK CO., LTD., Seoul (KR)

(72) Inventors: Sang Jun Min, Seoul (KR); Tae Jin Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 542 days.

(21) Appl. No.: 17/597,144

(22) PCT Filed: Jun. 17, 2020

(86) PCT No.: PCT/KR2020/007809
§ 371 (c)(1),
(2) Date: Dec. 27, 2021

(87) PCT Pub. No.: WO2020/262876
PCT Pub. Date: Dec. 30, 2020

(65) Prior Publication Data
US 2022/0342276 A1  Oct. 27, 2022

(30) Foreign Application Priority Data

Jun. 24, 2019 (KR) .................. 10-2019-0074860

(51) Int. Cl.
*G03B 5/00* (2021.01)
*G02B 13/00* (2006.01)

(52) U.S. Cl.
CPC ........... *G03B 5/00* (2013.01); *G02B 13/0065* (2013.01); *G03B 2205/0007* (2013.01)

(58) Field of Classification Search
CPC .............. G03B 5/00; G03B 2205/0007; G02B 13/0065

(Continued)

(56) References Cited

U.S. PATENT DOCUMENTS 9,927,600 B2  3/2018  Goldenberg et al.
2009/0051804 A1  2/2009  Nomura et al.
(Continued)

FOREIGN PATENT DOCUMENTS

JP  2014-202843 A  10/2014
KR  10-0877070 B1  1/2009
(Continued)

OTHER PUBLICATIONS

International Search Report dated Sep. 21, 2020 in International Application No. PCT/KR2020/007809.
(Continued)

*Primary Examiner* — Jerry L Brooks
(74) *Attorney, Agent, or Firm* — Saliwanchik, Lloyd & Eisenschenk

(57) ABSTRACT

An embodiment comprises: a lens module; a first optical path change part including an incident surface and an emitting surface, and reflecting light, which is incident onto the incident surface, to emit the light via the emitting surface; and a second optical path change part including a first surface which faces the emitting surface in an optical axial direction of the lens module and a second surface which is an opposite surface to the first surface, wherein, in order to change the path of light emitted via the emitting surface, the first optical path change part is tilted or rotated about a first axis perpendicular to the optical axial direction, and, in order to change the path of light emitted from the second surface, the second optical path change part is tilted or rotated about a second axis perpendicular to the optical axial direction and the first axis.

20 Claims, 24 Drawing Sheets

(58) Field of Classification Search
USPC .......................................................... 359/831
See application file for complete search history.

(56) References Cited

U.S. PATENT DOCUMENTS

| | | |
|---|---|---|
| 2018/0203328 A1 | 7/2018 | Kang et al. |
| 2018/0343391 A1 | 11/2018 | Goldenberg et al. |
| 2019/0129197 A1 | 5/2019 | Kim et al. |

FOREIGN PATENT DOCUMENTS

| | | | |
|---|---|---|---|
| KR | 10-2009-0086755 A | 8/2009 | |
| KR | 10-2017-0105236 A | 9/2017 | |
| KR | 10-2019-0059444 A | 5/2019 | |
| WO | WO-2019117652 A1 * | 6/2019 | ......... G02B 13/0065 |

OTHER PUBLICATIONS

Office Action dated Jun. 3, 2023 in Chinese Application No. 202080046318.7.

\* cited by examiner

CAMERA MODULE AND OPTICAL DEVICE COMPRISING SAME

CROSS-REFERENCE TO RELATED APPLICATIONS

This application is the U.S. national stage application of International Patent Application No. PCT/KR2020/007809, filed Jun. 17, 2020, which claims the benefit under 35 U.S.C. § 119 of Korean Application No. 10-2019-0074860, filed Jun. 24, 2019, the disclosures of each of which are incorporated herein by reference in their entirety.

TECHNICAL FIELD

Embodiments relate to a camera module and an optical device including the same.

BACKGROUND ART

Technology of a voice coil motor (VCM), which is used in existing general camera modules, is difficult to apply to a miniature low-power camera module, and studies related thereto have been actively conducted.

In the case of a camera module configured to be mounted in a small electronic product, such as a smart phone, the camera module may frequently receive shocks during use, and may undergo fine shaking due to, for example, the shaking of a user's hand. In consideration thereof, technology enabling a device for inhibiting handshake to be additionally installed to a camera module has been developed.

DISCLOSURE

Technical Problem

Embodiments provide a camera module and an optical device including the same, which are capable of reducing the amount of space or a size required to realize an OIS operation.

Technical Solution

A camera module according to an embodiment includes a lens module, a first optical path changer, which includes an incident surface and an emitting surface and which reflects light introduced through the incident surface, toward the emitting surface, and a second optical path changer, which includes a first surface, which faces the emitting surface in an optical-axial direction of the lens module, and a second surface, which is disposed opposite the first surface, wherein the first optical path changer is tilted or rotated with respect to a first axis perpendicular to the optical-axial direction in order to change the path of the light emitted from the emitting surface, and the second optical path changer is tilted or rotated with respect to a second axis, which is perpendicular both to the optical-axial direction and to the first axis, in order to change the path of the light emitted from the second surface.

The first surface and the second surface may be parallel to each other. The length of the second prism between the first surface and the second surface is less than the length of the incident surface of the first prism in the optical-axial direction.

The first optical path changer may include a first prism having the incident surface, a reflection surface, and the emitting surface, and the second optical path changer may include a second prism, which is a planar prism having the first surface and the second surface.

The first surface and the second surface may not be parallel to each other. The maximum length of the second prism between the first surface and the second surface may be less than the length of the incident surface of the first prism in the optical-axial direction.

The lens module, the second optical path changer, and the first optical path changer may be arranged in the optical-axial direction.

The first optical path changer may include a first housing, a first holder disposed in the first housing, a first prism, which is disposed in the first holder and includes the incident surface and the emitting surface, a first coil disposed at one of the first housing and the first holder, and a first magnet disposed at a remaining one of the first housing and the first holder so as to correspond to the first coil, wherein the first holder is tilted or rotated with respect to the first axis by the interaction between the first coil and the first magnet.

The second optical path changer may include a second housing, a second holder disposed in the second housing, a second prism, which is disposed in the second holder and includes the first surface and the second surface, a second coil disposed at one of the second housing and the second holder, and a second magnet disposed at a remaining one of the second housing and the second holder so as to correspond to the second coil, wherein the second holder is tilted or rotated with respect to the second axis by the interaction between the second coil and the second magnet.

The first housing and the second housing may be integrally formed.

The lens module may include a plurality of lenses, and may be moved in the optical-axial direction.

The camera module may include a first elastic member, which is coupled both to the first holder and to the first housing, a second elastic member, which is coupled both to the second holder and to the second housing, an image sensor, configured to receive the light emitted from the lens module, and a circuit board, conductively connected to the first coil and the second coil.

The second prism may have an upper surface disposed between the first surface and the second surface, a lower surface disposed opposite the upper surface, and two side surfaces disposed between the upper surface and the lower surface so as to be opposite each other.

A camera module according to another embodiment includes a lens module, a first optical path changer, which includes an incident surface, a reflection surface configured to reflect the light introduced through the incident surface, and an emitting surface configured to emit the light reflected by the reflection surface, and a second optical path changer, which includes a first surface, through which the light emitted from the emitting surface introduced, and a second surface configured to emit the light introduced through the first surface, wherein the first optical path changer, the second optical path changer, and the lens module are arranged in that order in an optical-axial direction, the first optical path changer is tilted or rotated with respect to a first axis perpendicular to the optical-axial direction, and the second optical path changer is tilted or rotated with respect to a second axis perpendicular both to the optical-axial direction and to the first axis.

A camera module according to a further embodiment includes a first optical path changer, which includes a first surface, into which light is introduced, and a second surface, which emits the light introduced through the first surface, and is disposed opposite the first surface, a second optical path changer, which includes an incident surface and an emitting surface and which reflects the light introduced into the incident surface from the second surface, toward the emitting surface, and a lens module, wherein the first optical path changer is rotated or tilted with respect to a first axis parallel to the optical-axial direction of the lens module, the first surface, the second surface, and the incident surface overlap one another in a second axis perpendicular to the optical-axial direction, and the second optical path changer is rotated or tilted with respect to a third axis perpendicular both to the first axis and to the second axis.

Advantageous Effects

Embodiments are capable of reducing the amount of space required to realize OIS operation and are thus capable of reducing the size of a camera module.

BEST MODE

Figure 1:
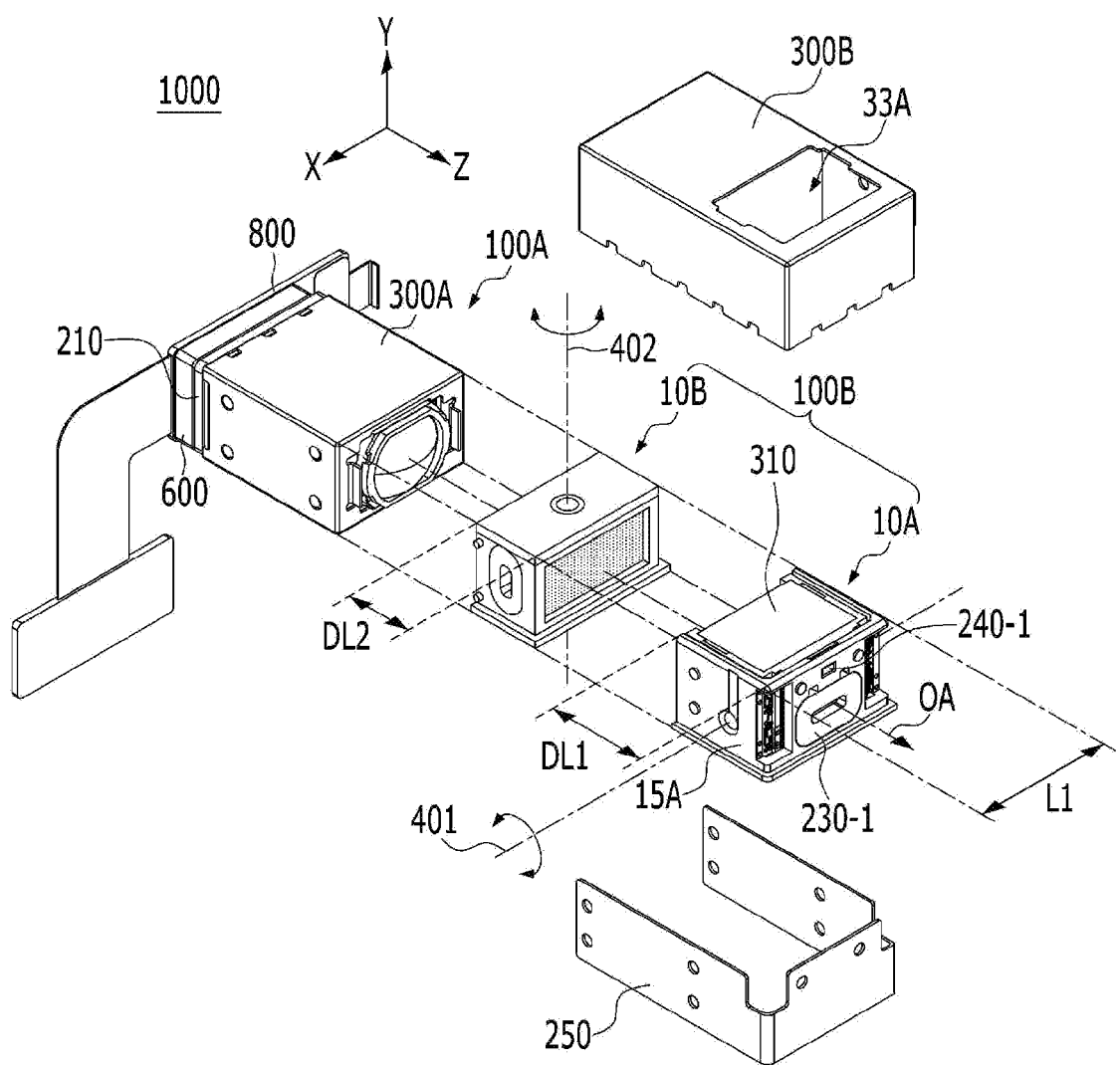
FIG. 1 is an exploded perspective view of a camera module according to an embodiment.

Hereinafter, embodiments of the present invention capable of concretely achieving the above objects will be described with reference to the accompanying drawings.

In the following description of the embodiments, it will be understood that, when an element is referred to as being formed "on" or "under" another element, it can be directly "on" or "under" the other element, or can be indirectly disposed, with one or more intervening elements therebetween. In addition, it will also be understood that "on" or "under" the element may mean an upward direction or a downward direction based on the element.

In addition, relative terms such as, for example, "first", "second", "on/upper/above" and "beneath/lower/below", used in the following description may be used to distinguish any one substance or element from another substance or element without requiring or containing any physical or logical relationship or sequence between these substances or elements. The same reference numeral designates the same element throughout all the drawings.

Unless otherwise defined, the terms "comprise," "include" or "have" used in the above description are used to designate the presence of features, steps or combinations thereof described in the specification, and should be understood so as not to exclude the presence or possibility of additional inclusion of one or more different features, steps or combinations thereof. Furthermore, the term "correspond" or the like may include at least one of the meanings of "face" or "overlap".

Hereinafter, a camera module according to an embodiment and an optical device including the camera module will be described with reference to the accompanying drawings. For convenience of description, although the camera module according to the embodiment is described using a quadrilateral coordinate system (x,y,z), the lens moving apparatus may be described using some other coordinate system, and the embodiments are not limited thereto. In the respective drawings, the X-axis and the Y-axis mean directions perpendicular to an optical OA axis, i.e. the Z-axis. The Z-axial direction, which is the optical-axial direction, may be referred to as a "first direction", the X-axial direction may be referred to as a "second direction", and the Y-axial direction may be referred to as a "third direction". Furthermore, the Y-axis may be referred to as a "first axis", and the Y-axial direction may be referred to as a "first axial direction". The X-axis may be referred to as a "second axis", and the X-axial direction may be referred to as a "second axial direction".

In the following description, the term "terminal" may be interchangeably used with "pad", "electrode" or "conductive layer".

A "handshake correction function", which is applied to a subminiature camera module of a mobile device such as, for example, a smart phone or a tablet PC, may be a function of moving a lens in a direction perpendicular to an optical-axial direction or tilting the lens with respect to the optical axis so as to cancel vibration (or motion) caused by shaking of the user's hand.

Furthermore, the term "auto-focusing function" may refer to a function of moving a lens in an optical-axial direction according to a distance to an object and thus automatically focusing on the object so as to obtain a clear image in an image sensor.

Hereinafter, the term "camera module" may be interchangeably used with "camera", "imaging unit" or "photographing unit".

Figure 2:
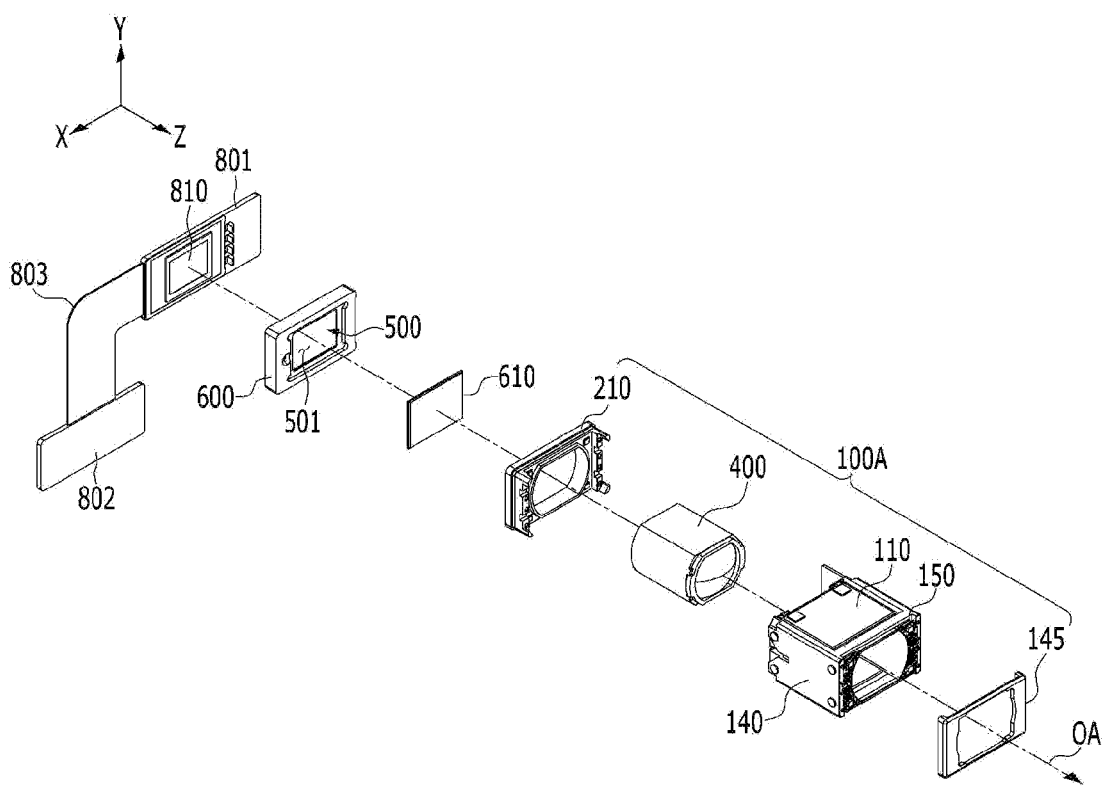
FIG. 2 is an exploded perspective view of a circuit board, a sensor base, a filter, and the first movable unit, which are shown in FIG. 1.
Figure 3A:
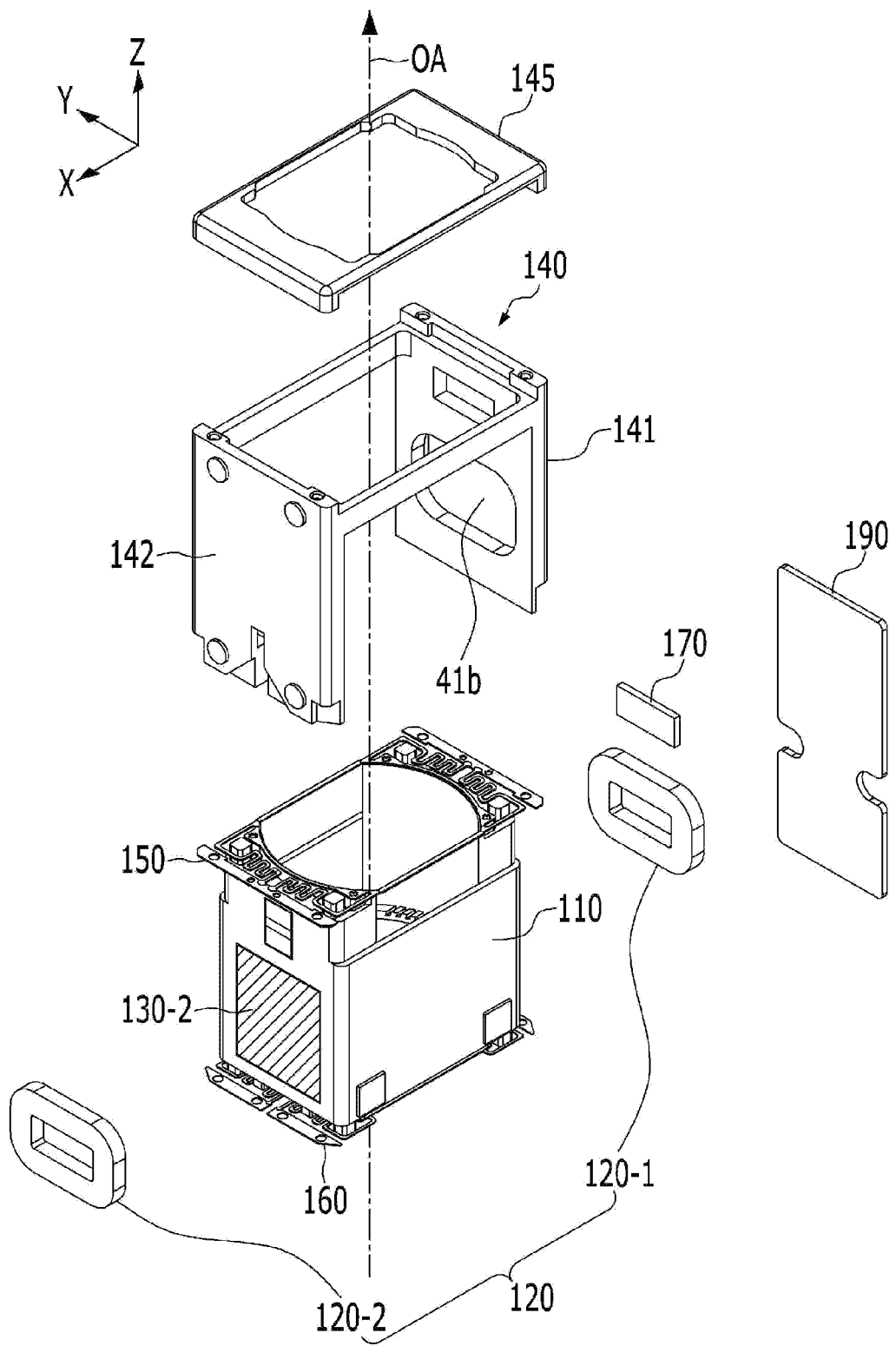
FIG. 3A is a first exploded perspective view illustrating some of the components of the first movable unit shown in FIG. 2.
Figure 3B:
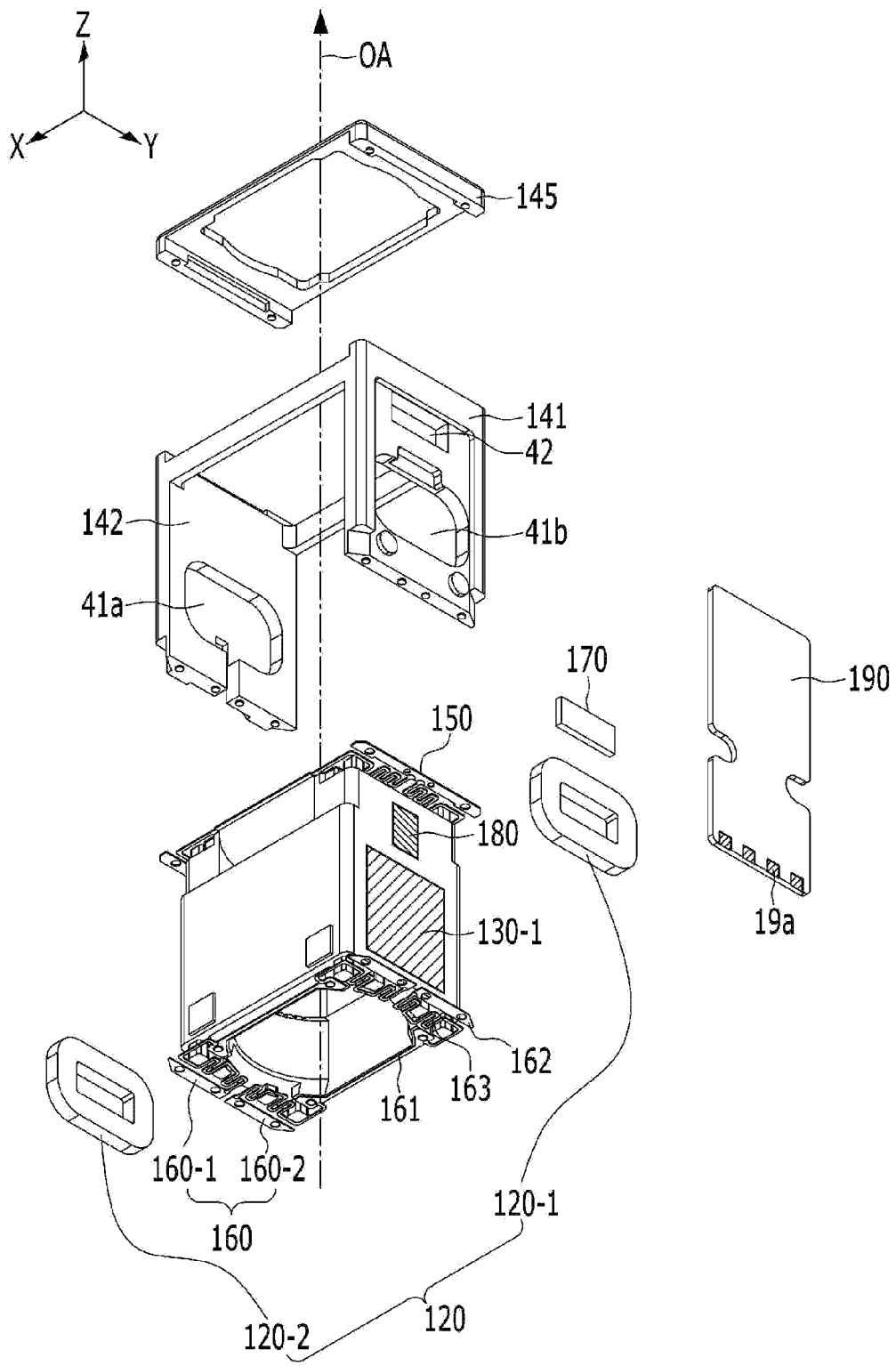
FIG. 3B is a second exploded perspective view illustrating the components shown in FIG. 3A.
Figure 3C:
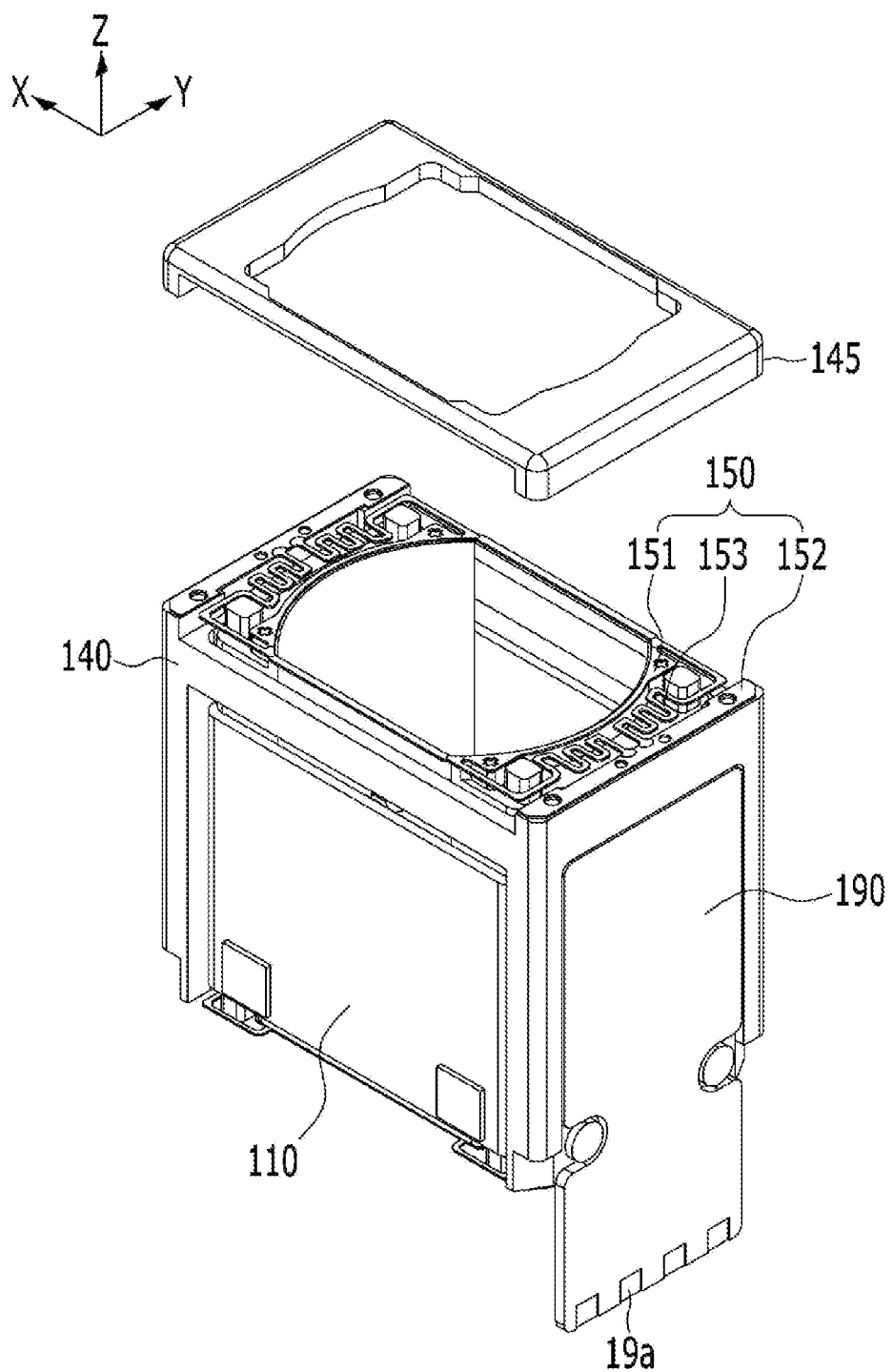
FIG. 3C is a third exploded perspective view illustrating some of the components shown in FIG. 3A.

FIG. 1 is a perspective view of a camera module 1000 according to an embodiment. FIG. 2 is an exploded perspective view of the circuit board 800, the sensor base 600, the filter 610, and the first movable unit 100A, which are shown in FIG. 1. FIG. 3A is a first exploded perspective view illustrating some of the components of the first movable unit 100A shown in FIG. 2. FIG. 3B is a second exploded perspective view illustrating the components shown in FIG. 3A. FIG. 3C is a third exploded perspective view illustrating some of the components shown in FIG. 3A.

Referring to FIGS. 1 to 3C, the camera module 1000 may include an image sensor 810, the first movable unit 100A, and a second movable unit 100B.

The first movable unit 100A may alternatively be referred to as an AF operation unit, configured to perform an autofocus function and/or a zoom function, and the second movable unit 100B may alternatively be referred to as an optical image stabilization (OIS) operation unit, configured to perform handshaking correction.

The second movable unit 100B may include a first optical path changer 10A and a second optical path changer 10B. Furthermore, the second movable unit 100B may further include a second circuit board 250 conductively connected to the first optical path changer 10A and the second optical path changer 10B.

The first movable unit 100A may include a first position sensor 170 and a sensing magnet 180, which are configured to perform an AF feedback operation.

The second movable unit 100B may include a second position sensor and sensing magnets 18A and 18B, which are configured to perform an OIS feedback operation. The second position sensor may include a first sensor 240-1 and a second sensor 240-2.

The camera module 1000 may further include at least one of the circuit board 800, the sensor base 600, the filter 610, a first cover member 300A, and a second cover member 300B.

The first cover member 300A may accommodate therein the circuit board 800, the image sensor 810, the sensor base 600, the filter 610, and the first movable unit 100A.

The second cover member 300B may accommodate therein the second movable unit 100B.

The second cover member 300B may have an opening 33A through which an incident surface 8A of a reflective member 310 of the first optical path changer 10A is exposed.

Although the second cover member 300B shown in FIG. 1 accommodates therein both the first optical path changer 10A and the second optical path changer 10B, the disclosure is not limited thereto. In another embodiment, the second cover member may further include a first cover can (or a first cover), configured to accommodate therein the first optical path changer 10A, and a second cover can (or a second cover), configured to accommodate therein the second optical path changer 10B.

Although not shown in FIG. 1, the camera module 1000 may further include at least one of a connector 840 disposed at the circuit board 800, a motion sensor (not shown), and a controller (not shown).

The image sensor 810 may receive an image included in the light that is introduced through the second movable unit 100B and the first movable unit 100A, and may convert the received image into an electric signal.

For example, the image sensor 810 may include an imaging area 805 (see FIG. 9A) configured to detect the light that has passed through a lens module 400. Here, the imaging area 805 (see FIG. 9A) may be alternatively referred to as an effective area, a light-receiving area, or an active area.

For example, the image sensor 810 may be a portion on which an image included in the light that has passed through the filter 610 is formed.

The image sensor 810 may be disposed or mounted on the circuit board 800.

The circuit board 800 may include various circuits, elements, controllers and the like in order to convert the image formed on the image sensor 810 into an electrical signal and transmit the electrical signal to an external device. Furthermore, the circuit board 800 may be provided thereon with a circuit pattern, which is conductively connected to the image sensor and to various elements.

The circuit board 800 may be coupled to the sensor base 600 using an adhesive. For example, the circuit board 800 may be coupled to the lower portion of the sensor base 600.

For example, referring to FIG. 2, the circuit board 800 may include a first region 801 in which the image sensor 810 is disposed, a second region 802 in which the connector 840 is disposed, and a third region 803 connecting the first region 801 to the second region 802.

For example, the first region 801 may be alternatively referred to as a "first substrate", the second region 802 may be alternatively referred to as a "second substrate", and the third region 803 may be alternatively referred to as a "connecting substrate".

Although each of the first region 801 and the second region 802 may be a rigid substrate and the third region 803 may be a flexible substrate, the disclosure is not limited thereto. In another embodiment, at least one of the first to third regions 801 to 803 may include a rigid substrate, and the remaining ones may include flexible substrates.

The sensor base 600 may include a seating portion at which the filter 610 is disposed. For example, the seating portion 500 may be formed on the upper surface of the sensor base 600, and may be configured to have the form of a recess, a cavity or a hole, which is depressed from the upper surface of the sensor base 600, without being limited thereto. In another embodiment, the seating portion may be configured to have the form of a projection, which projects from the upper surface of the sensor base 600. The sensor base 600 may be alternatively referred to as a "holder".

The filter 610 may be disposed and mounted on the seating portion 500 of the sensor base 600.

The lower portion of the base 210 of the first movable unit 100A may be coupled or attached to the upper portion or the upper surface of the sensor base 600 using an adhesive such as epoxy, thermohardening adhesive or UV hardening adhesive.

The seating portion in the sensor base 600 may include an inner surface and a bottom surface, and the filter 610 may be disposed on the bottom surface of the seating portion 500 of the sensor base 600.

The sensor base 600 may have therein a bore 501 such that the light that passes through the filter 610 is introduced into the image sensor 810. For example, the bore 501 may be formed through the sensor base 600 in the direction of the optical axis OA, and may be alternatively referred to as a through hole.

For example, the optical axis OA may be the optical axis of the lens module 400. For example, the optical axis OA may be an axis perpendicular to the image sensor 810 (or the imaging area 805).

For example, the bore 600 may be formed through the center of the sensor base 600 and may be disposed so as to correspond to or face the image sensor 810. For example, although the bore 501 may be provided in the bottom surface of the seating portion 500 and may have an area smaller than that of the filter 610, the disclosure is not limited thereto.

The filter 610 may serve to inhibit light in a specific frequency band, among the light passing through the lens module 400, from entering the image sensor 810.

Although the filter 610 may be, for example, an infrared-blocking filter, the disclosure is not limited thereto. For example, the filter 610 may be disposed so as to be parallel to the x-y plane perpendicular to the optical axis OA.

For example, the filter 610 may be attached to the bottom surface of the seating portion 500 in the sensor base 600 by means of an adhesive member (not shown) such as UV epoxy.

The filter 610 and the image sensor 810 may be spaced apart from each other so as to face each other in the direction of the optical axis OA or in the first direction.

The motion sensor may be mounted on and conductively connected to the circuit board 800, and may output angular velocity information about motion of the camera module 100. The motion sensor may be embodied as a biaxial or triaxial gyro sensor or an angular velocity sensor. The controller may be mounted or disposed on the circuit board 800, and may be conductively connected to the circuit board 800.

The circuit board 800 may be conductively connected to the first movable unit 100A and the second movable unit 100B. For example, the circuit board 800 may be conductively connected to a first circuit board 190 of the first movable unit 100A and a second circuit board 250 of the second movable unit 100B.

For example, a drive signal may be supplied to a first coil 120 of the first movable unit 100A via the circuit board 800 and the first circuit board 190.

Furthermore, a drive signal may be supplied to the first position sensor 170 of the first movable unit 100A via the circuit board 800 and the first circuit board 190. The output of the first position sensor 170 may be transmitted to the circuit board 800 via the first circuit board 190.

Furthermore, drive signals may be respectively supplied to second and third coils 230-1 and 230-2 of the second movable unit 100B via the second circuit board 250 and the circuit board 800.

Furthermore, a drive signal may be supplied to second position sensors 240-1 and 240-2 of the second movable unit 100B via the second circuit board 250 and the circuit board 800.

The output of the second position sensors 240-1 and 240-2 may be transmitted to the circuit board 800 via the second circuit board 250.

The connector 840 may be conductively connected to the circuit board 800, and may include a port, which is to be conductively connected to an external device.

The camera module 1000 may serve to fulfil both an autofocusing function and an OIS function. The camera module 100 may perform a zoom function, and may have various focal lengths.

Referring to FIGS. 2, 3A and 3B, the first movable unit 100A may include the lens module 400, a bobbin 110, the first coil 120, magnets 130-1 and 130-2, and a housing 140.

Figure 8A:
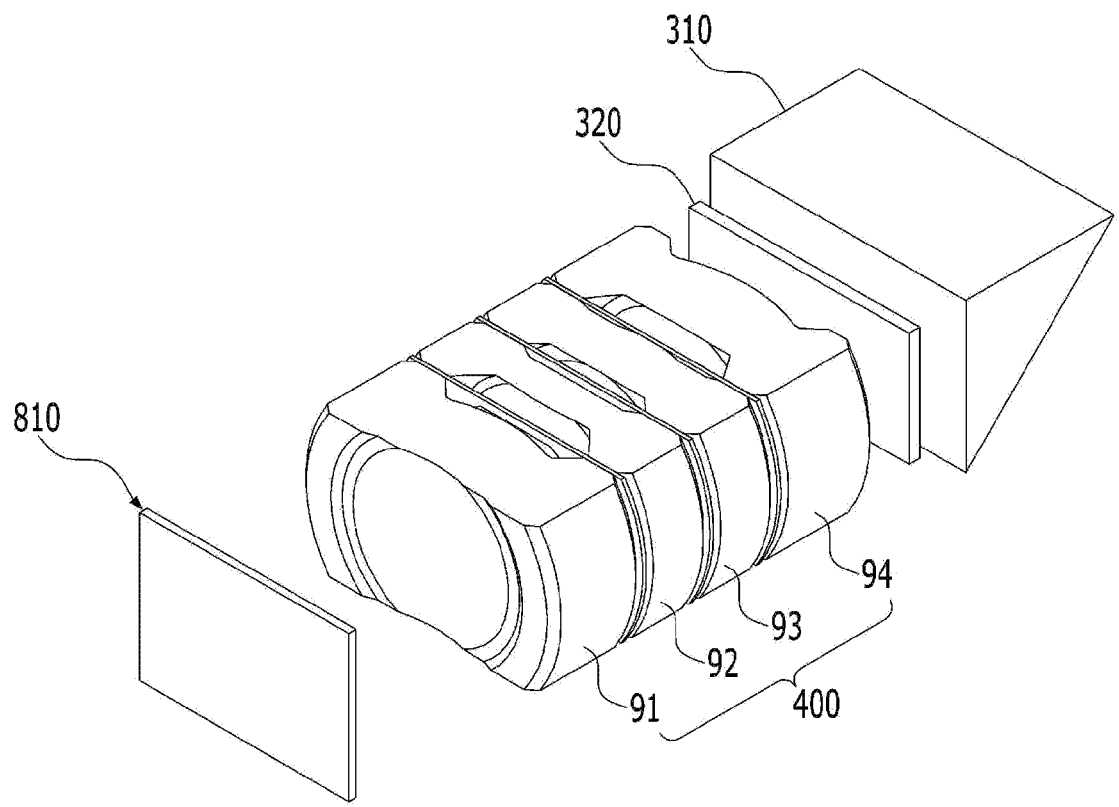
FIG. 8A is a perspective view of the image sensor, the lens module, the reflective member, and the light transmission member, which are shown in FIG. 1.

The lens module 400 may include a plurality of lenses 91 to 94 (see FIG. 8A). For example, the plurality of lenses 91 to 94 (see FIG. 8A) may be sequentially disposed or arranged in a direction parallel to the optical-axial direction or the optical axis OA. For example, the lens module 400 may include optical lenses having any of various shapes. For example, the lens module 400 may include a front lens having a positive power and a rear lens having a negative power.

The lens module 400 may be coupled or mounted to the bobbin 110.

The bobbin 110 may have a bore, a through hole or a cavity, in which the lens module 400 is mounted, and may be disposed in the housing 140.

The magnets 130-1 and 130-2 may be disposed at the bobbin 110, may be coupled or connected to the bobbin 110, or may be supported by the bobbin 110.

For example, the bobbin 110 may have reception grooves, in which the magnets 130-1 and 130-2 are received, disposed or seated. The reception grooves may be formed in side portions of the bobbin 110, for example, in two side portions or two outer surfaces of the bobbin 110, which are positioned opposite each other.

The magnets 130-1 and 130-2 may include a first AF magnet 130-1 and a second AF magnet 130-2. The first AF magnet 130-1 and the second AF magnet 130-2 may be disposed at two side portions of the bobbin 110, which face each other.

For example, the two outer surfaces of the bobbin 110, which are positioned opposite each other, may be provided therein with grooves in which the first AF magnet 130-1 and the second AF magnet 130-2 are respectively received.

For example, although each of the first AF magnet 130-1 and the second AF magnet 130-2 may be a monopolar magnetized magnet including a single N pole and a single S pole, the disclosure is not limited thereto. In another embodiment, each of the first AF magnet 130-1 and the second AF magnet 130-2 may be a bipolar magnetized magnet including two N poles and two S poles.

The first coil 120 may be disposed at the housing 140 so as to correspond to or face the magnets 130-1 and 130-2, or may be supported by the housing 140.

The first coil 120 may be disposed at side portions of the housing 140.

For example, the first coil 120 may include a first coil unit 120-1, which corresponds to or faces the first AF magnet 130-1, and a second coil unit 120-2, which corresponds to or faces the second AF magnet 130-2.

The first coil 120 may include the two coil units, and the magnets 130-1 and 130-2 may include the two AF magnets, without being limited thereto. In another embodiment, the first coil 120 may include one or three or more coil units, and the magnets, which correspond to the coil units, may include one or three or more AF magnets.

The first coil unit 120-1 and the second coil unit 120-2 may be disposed at two side portions 141 and 141 of the housing 140, which face each other.

For example, the first and second side portions 141 and 142 of the housing 140 may be respectively provided therein with reception portions 41a and 41b, which are configured to receive the first coils 120. Although each of the reception portions 41a and 41b may be configured to have the form of a groove or a through hole, the disclosure is not limited thereto. In another embodiment, each of the reception portions of the housing 140 may be configured to have the form of a protrusion for mounting or holding the first coil 120.

The first coil 120 may electromagnetically interact with the magnets 130-1 and 130-2.

In order to create electromagnetic force resulting from the interaction with the magnets 130-1 and 130-2, power or a drive signal may be applied to the coil 120.

By virtue of the electromagnetic interaction between the first coil 120 and the magnets 130-1 and 130-2, the bobbin 110, which is elastically supported by first and second elastic members 150 and 160, may be moved in the optical-axial direction or in the first direction.

By controlling a drive signal applied to the first coil 120, it is possible to control movement of the lens module 400 mounted on the bobbin 110 in the optical-axial direction or in the first direction, and thus it is possible to perform an autofocusing function and/or zoom function.

Although the first coil may have a form that is wound clockwise or counterclockwise about an axis perpendicular to the optical axis OA, the disclosure is not limited thereto. For example, the coil 120 may be configured to have a closed curve shape or a ring shape. In another embodiment, the first coil may be embodied as a coil ring, which is wound clockwise or counterclockwise about an axis perpendicular to the optical axis.

The number of each of the coil units included in the first coil 120 and the magnets 130-1 and 130-2 is not limited to two, and may be one or more in another embodiment.

Although the first coil 120 is disposed at the housing and the magnets 130-1 and 130-2 are disposed at the bobbin 110 in FIGS. 3A to 3c, the disclosure is not limited thereto. In another embodiment, the first coil may be disposed at the bobbin 110, and the magnets may be disposed at the housing 140 so as to correspond to or face the first coil.

The first movable unit 100A may include at least one elastic member configured to flexibly support the bobbin 110 with respect to the housing 140. Here, the at least one elastic member may be coupled both to the bobbin 110 and to the housing 140. In another embodiment, the first movable unit may not include the elastic member.

For example, the first movable unit 100A may include a first elastic member 150 and a second elastic member 160, each of which is coupled both to the bobbin 110 and to the housing 140. Here, the elastic member may be alternatively referred to as an "elastic unit" or a "spring".

For example, each of the first and second elastic members 150 and 160 may be coupled both to the bobbin 110 and to the housing 140.

For example, the first elastic member 150 may be coupled both to one end (for example, the upper portion) of the bobbin 110 and to one end (for example, the upper portion) of the housing 140. Although the first elastic member 150 is described as including a single spring, which is not separable into smaller pieces, the disclosure is not limited thereto. In another embodiment, the first elastic member may include a plurality of first elastic units, which are spaced apart from each other.

For example, the second elastic member 160 may be coupled both to the other end (for example, the lower portion) of the bobbin 110 and to the other end (for example, the lower portion) of the housing 140. The second elastic member 160 may include a plurality of second elastic units, which are spaced apart from each other. For example, the second elastic member 160 may include two elastic units 160-1 and 160-2.

For example, the first elastic member 150 may include a first inner frame 151, which is coupled to the upper portion, the upper surface or the upper end of the bobbin 110, a second outer frame 152, which is coupled to the upper portion, the upper surface or the upper end of the housing 140, and a first frame connector 153, connecting the first inner frame 151 to the first outer frame 152.

At least one of the first and second elastic units 160-1 and 160-2 may include a second inner frame 161, which is coupled to the lower portion, the lower surface, or the lower end of the bobbin 110, a second outer frame 162, which is coupled to the lower portion, the lower surface, or the lower end of the housing 140, and a second frame connector 163 connecting the second inner frame 161 to the second outer frame 162. Here, the term "inner frame" may be interchangeably used with "inner portion", and the term "outer frame" may be interchangeably used with "outer portion".

The first movable unit 100A may further include a holder or spacer 145, which is coupled to the first elastic member 150 and the housing 140. The spacer 145 may be spaced apart from the bobbin 110, and may serve to reinforce the coupling between the first elastic member 150 and the housing 140. In another embodiment, the spacer 145 may be omitted.

The first movably unit 100A may include the sensing magnet 180 and the first position sensor 170, which are configured to perform an AF feedback operation. Here, the first movable unit 100A may further include the first circuit board 190, which is conductively connected to the position sensor 170. The first circuit board 190 may be conductively connected to the circuit board 800.

The sensing magnet 180 may be disposed at one side portion (or one outer surface) of the bobbin 110. For example, the bobbin 110 may have therein a groove, in which the sensing magnet 180 is received, disposed or seated.

For example, although the sensing magnet 180 may be disposed at one side portion (or one outer surface) of the bobbin 110, at which the first AF magnet 130-2 is disposed, the disclosure is not limited thereto.

For example, although the sensing magnet 180 may be disposed between the first elastic member 150 and the first AF magnet 130-2, the disclosure is not limited thereto.

For example, the sensing magnet 180 may not overlap the magnet 130 in a direction perpendicular to the optical axis.

For example, although the sensing magnet 180 may be a monopolar magnetized magnet including a single N pole and a single S pole, the disclosure is not limited thereto. In another embodiment, the sensing magnet 180 may be a bipolar magnetized magnet including two N poles and two S poles.

The first movable unit 100A may further include a balancing magnet (not shown), which is disposed at the bobbin 110 so as to cancel the influence of the sensing magnet 180 on the first coil 120 and/or the magnets 130-1 and 130-2 and to establish weight equilibrium of the first movable unit. The balancing magnet may be disposed at a second side portion (or a second outer surface) of the bobbin 110, which is positioned opposite a first side portion (or a first outer surface) of the bobbin 110, at which the sensing magnet is disposed.

The first circuit board 190 and the first position sensor 170 may be disposed at the first side portion 141-1 or the outer surface of the first side portion 141-1, at which the first AF magnet 130-1 is disposed.

For example, the first circuit board 190 may be disposed outside the first coil unit 120-1, which is disposed at the first side portion 141-1 of the housing 140. Here, the outside of the first coil unit 120-1 may be the side opposite the center of the housing 140 relative to the first coil unit 120-1.

The first position sensor 170 may be mounted or disposed on the first surface of the first circuit board 190, and may be disposed in a seating portion 42 formed in the first side portion 141 of the housing 140.

The first circuit board 190 may include a plurality of terminals 19a. The plurality of terminals 19a may be disposed on the second surface of the first circuit board 190, and may be conductively connected to the circuit board 800. The second surface of the first circuit board 190 may be the surface opposite the first surface of the first circuit board 190. Although the first circuit board 190 includes four terminals for conductive connection to the outside in the embodiment shown in FIG. 3C, the disclosure is not limited thereto. In another embodiment, the first circuit board may also include five or more terminals.

The first position sensor 170 may be conductively connected to some of the terminals 19a of the first circuit board 190.

The first coil unit 120-1 may be conductively connected to the first circuit board 190 via at least one of the first and second elastic units. For example, the second coil unit 120-2 may be connected to the first coil unit 120-1 via the second elastic member 160.

For example, one end of the second coil unit 120-2 may be coupled at one end thereof to the first elastic unit 160-1 and at the other end thereof to the second elastic unit 160-2, and one end of the first coil unit 120-1 may be coupled to the first elastic unit 160-1. The other end of the first coil unit 120-1 may be conductively connected to one terminal of the first circuit board 190, and the second elastic unit 160-2 may be conductively connected to another terminal of the first circuit board 190.

At the initial position of the bobbin 110, the first position sensor 170 may overlap the sensing magnet 180 disposed at the bobbin 110 in a direction toward the second side portion of the housing 140 from the first side portion 141 thereof, which is perpendicular to the optical axis, without being limited thereto. In another embodiment, the first position sensor 170 may not overlap the sensing magnet 180.

Although the first position sensor 170 may be embodied as a Hall sensor alone, the disclosure is not limited thereto. The first position sensor 170 may also be embodied as a driver IC (Integrated Circuit) including a Hall sensor.

For example, when the first position sensor 170 is embodied as a driver IC including a Hall sensor, the first position sensor 170 may include two terminals for receiving power signals VDD and GND and two terminals for transmitting and receiving a clock signal and data for data communication (for example, I2C) with an external device. Here, the driver IC may directly supply a drive signal (for example, drive current) to the first coil 120 via the circuit board 190.

For example, when the first position sensor 170 is embodied as a Hall sensor alone, the first position sensor 170 may include two input terminals and two output terminals. For example, each of the two input terminals and the two output terminals of the first position sensor 170 may be conductively connected to a corresponding one of the four terminals of the first circuit board 190. For example, drive signals may be applied to the input terminals of the first position sensor 170 from the circuit board 800 via the two terminals of the first circuit board 190, and the output signals output from the first position sensor 170 may be applied to the circuit board 800 via the other two terminals of the first circuit board 190.

In another embodiment, the sensing magnet may be disposed at the housing 140, and the first position sensor may be disposed at the bobbin so as to correspond to the sensing magnet, unlike the embodiment shown in FIGS. 3A to 3C.

By virtue of the electromagnetic force resulting from the interaction between the first coil 120 and the magnets 130-1 and 130-2, the sensing magnet 180 may be moved together with the bobbin 110 in the direction of the optical axis OA or in the first direction (for example, in the Z-axial direction). At this point, the first position sensor 170 may detect the intensity of the magnetic field of the sensing magnet 180, which is moved in the optical-axial direction, and may output the output signal corresponding to the result of the detection. Here, the output signal from the first position sensor 170 may be of a voltage type or a current type.

The controller of a camera module 200 and the controller 780 of an optical device 200A may detect displacement of the bobbin 110 in the optical-axial direction based on the output signal output from the first position sensor 170.

The first movable unit 100A may include the base 210, which is disposed between the housing 140 and the sensor base 500. The base 210 may have therein a bore corresponding to the bore in the bobbin 110 and the bore in the housing 140. The base 210 may be coupled to the housing 140 and/or the first cover member 300A.

Figure 4:
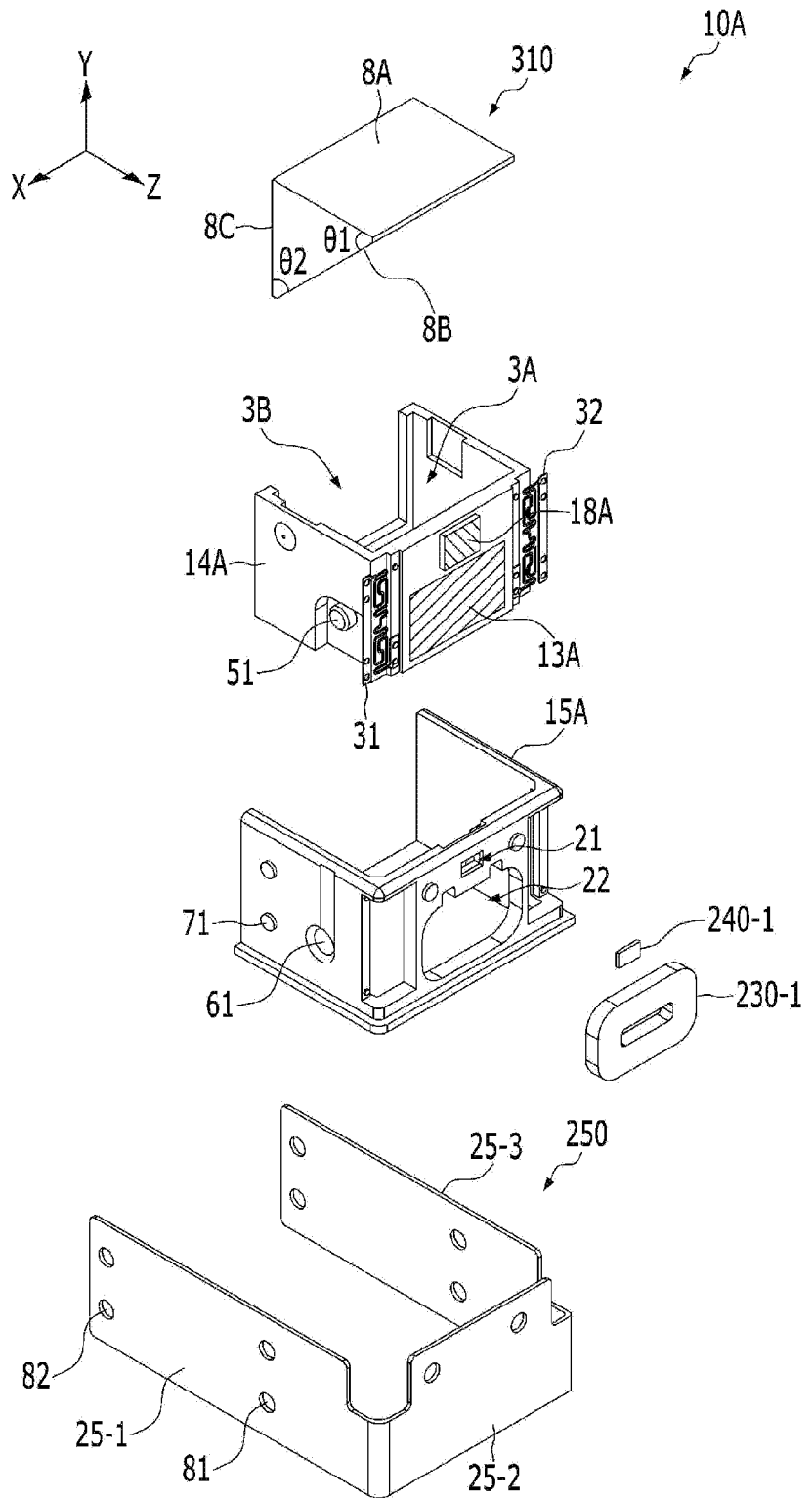
FIG. 4 is an exploded perspective view of the first optical path changer shown in FIG. 1.
Figure 5:
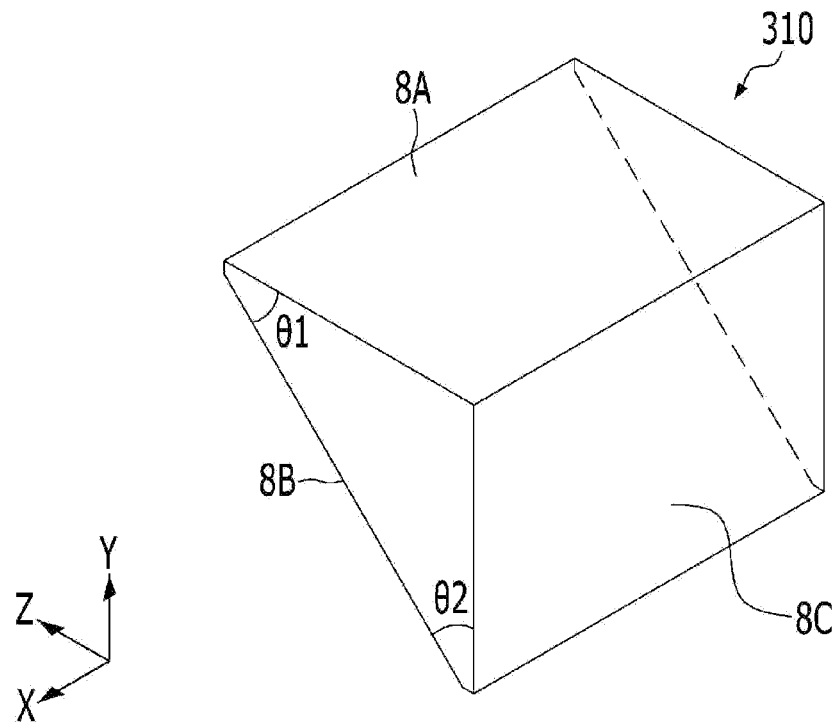
FIG. 5 is a perspective view of the reflective member, the first holder, and the elastic member, which are shown in FIG. 4.
Figure 5:
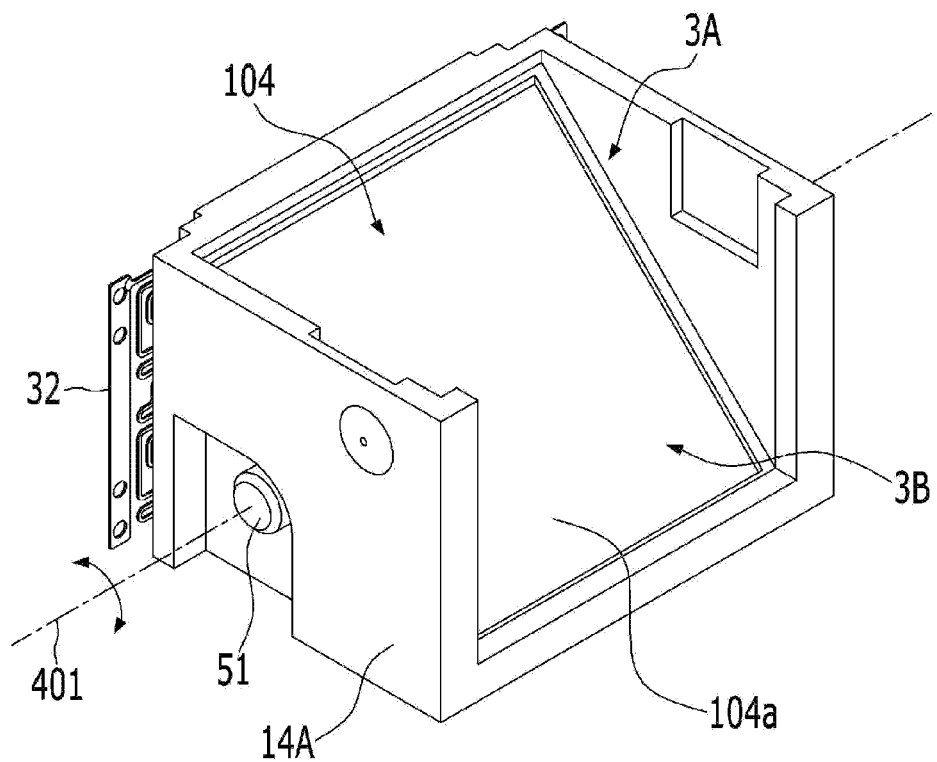

FIG. 4 is an exploded perspective view of the first optical path changer 10A shown in FIG. 1. FIG. 5 is a perspective view of the reflective member 310, the first holder 14A, and the elastic member 32, which are shown in FIG. 4.

Referring to FIGS. 4 and 5, the first optical path changer 10A may include the first holder 14A, the reflective member 310, a magnet 13A, a first housing 15A, and the second coil 230-1.

The first optical path changer 10A may include elastic members 31 and 32, which are coupled to the first holder 14A and the first housing 15A. The elastic members 31 and 32 may flexibly support the first holder 14A on the first housing 15A.

Although two elastic members 31 and 32 are shown in FIGS. 4 and 5, the disclosure is not limited thereto. In another embodiment, the first optical changer 10A may include one or more elastic members. In a further embodiment, the elastic members 31 and 32 may be omitted from the optical path changer.

Each of the elastic members 31 and 32 may include an inner portion coupled to the first holder 14A, an outer portion coupled to the first housing 15A, and a connector connecting the inner portion to the outer portion. The connector may include a bent portion, which is bent at least once.

Furthermore, the first optical path changer 10A may include the sensing magnet 18A and the first sensor 240-1 for OIS feedback operation.

By means of the sensing magnet 18A and the first sensor 2401, it is possible to detect displacement of the first holder 14A, which is tilted or rotated with respect to the second axis (the X-axis). For example, by means of the sensing magnet 18A and the first sensor 240-1, it is possible to detect displacement of the first holder 14A in the first axial direction (in the Y-axial direction).

The reflective member 310 may be disposed at the first holder 14A so as to change the direction of light. For example, although the reflective member 310 may be a prism configured to reflect light, the disclosure is not limited thereto. In another embodiment, the reflective member 310 may be a mirror.

The reflective member 310 may include an incident surface 8A and an emitting surface 8C. The reflective member 310 may reflect the light introduced through the incident surface 8A, toward the emitting surface 8C.

For example, the reflective member 310 may be a right angle prism, which has the incident surface 8A, a reflection surface 8B, and the emitting surface 8C. For example, the included angle between the incident surface 8A and the emitting surface 8C may be a right angle.

For example, each of the first included angle θ1 between the incident surface 8A and the reflection surface 8B and the second included angle θ2 between the emitting surface 8C and the reflection surface 8B may range from 30 degrees to 60 degrees. For example, although each of the first included angle θ1 and the second include angle θ2 may be 45 degrees, the disclosure is not limited thereto.

The first optical path changer 10A may be tilted or rotated relative to a first reference axis 401 so as to change the direction of the light reflected toward the emitting surface 8C.

The first holder 14A may include a seating portion 104 on which the reflective member 310 is disposed or mounted. The seating portion 104 may be configured to have the form of a groove, and may include a seating surface 104a on which the reflection surface 8b of the reflective member 310 is disposed.

For example, although the seating surface 104a may be a sloped surface that is inclined with respect to the optical axis OA and the angle of inclination of the seating surface 104a may be equal to the second included angle θ2, the disclosure is not limited thereto. In another embodiment, the angle of inclination of the seating surface 104a may be different from the second included angle θ2.

For example, the first holder 14A may have therein a first opening 3A, through which the incident surface 8A of the reflective member 310 is exposed, and a second opening 3B, through which the emitting surface 8C of the reflective member 310 is exposed.

The emitting surface 8C of the reflective member 310, which is mounted to the first holder 14A, may be oriented so as to face the lens module 400. For example, the emitting surface 8C of the reflective member 310, which is mounted to the first holder 14A, may be oriented so as to correspond to or face a first surface 321 of a translucent portion 320 of the second optical path changer 10B.

The first holder 14A may be provided on the outer surface thereof with a first coupler 51.

For example, the first coupler 51 may be disposed at first and second side portions of the first holder 14A, which face each other or are positioned opposite each other.

The first holder 14A may be disposed in the first housing 15A. The first holder 14A may be rotated or tilted in the first housing 15A with respect to the reference axis 401.

The first housing 15A may have therein a first opening corresponding to the first opening 3A in the first holder 14A and a second opening corresponding to the second opening 3B in the first holder 14A. In other words, the first housing 15A may expose the incident surface 8A and the emitting surface 8C of the reflective member 310 disposed in the first holder 14A.

The first housing 15A may include a second coupler 61, which is coupled to the first coupler 51 of the first holder 14A.

For example, although the second coupler 61 may be provided at the first and second side portions of the first housing 15A, which face each other or are positioned opposite each other, the disclosure is not limited thereto. Although the first coupler 51 of the first holder 14A and the second coupler 61 of the first housing 15A may be coupled to each other in a fitting manner, the disclosure is not limited thereto.

Although the first coupler 51 of the first holder 14A is shown as having the form of a protrusion and the second coupler 61 of the first housing 15A is shown as having the form of a hole or groove in FIG. 4, the disclosure is not limited thereto. In another embodiment, the first coupler of the first holder 14A may have the form of a hole or groove, and the second coupler 61 of the first housing 15A may have the form of a protrusion.

The first housing 15A may include a coupling protrusion 71, which is coupled to a hole 81 in the second circuit board 250.

Although the magnet 13A may be disposed at the first holder 14A and the second coil 230-1 may be disposed at the first housing 15A, the disclosure is not limited thereto. In another embodiment, the magnet 13A may be disposed at the first housing 15A, and the second coil 230-1 may be disposed at the first holder 14A.

For example, the second coil 230-1 may be disposed in the seating portion 22 formed in the third side portion of the first housing 15A. Although the seating portion 22 may have the form of a hole or groove, the disclosure is not limited thereto. In another embodiment, the seating portion 22 may have the form of a protrusion. Here, the third side portion of the first housing 15A may be disposed between the first and second side portions of the first housing 15A so as to connect the first and second side portions of the first housing 15A to each other.

For example, the magnet 13A may be disposed in a groove formed in the third side portion of the first holder 14A. Here, the third side portion of the first holder 14A may be disposed between the first and second side portions of the first holder 14A so as to connect the first and second side portions of the first holder 14A to each other.

The first sensor 240-1 may be disposed at the first housing 15A, and the sensing magnet 18A may be disposed at the first holder 14A so as to correspond to or face the first sensor 240-1.

For example, the first sensor 240-1 may be disposed at the third side portion of the housing 15A, and the sensing magnet 18A may be disposed at the third side portion of the first holder 14A so as to correspond to or face the first sensor 240-1.

In another embodiment, the first sensor 240-1 may be disposed at the first holder 14A, and the sensing magnet 18A may be disposed at the first housing 15A.

The second coil 230-1 may be conductively connected to the second circuit board 250 so as to allow a drive signal from the second circuit board 250 to be applied to the second coil 230-1.

The second circuit board 250 may be conductively connected to the circuit board 800, and may receive a drive signal for the second coil 230-1 from the circuit board 800.

The first sensor 240-1 may be conductively connected to the second circuit board 250 so as to allow a drive signal or drive power from the second circuit board 250 to be applied to the first sensor 240-1. The second circuit board 250 may receive a drive signal or drive power for the first sensor 240-1 from the circuit board 800.

The output of the first sensor 240-1 may be supplied to the second circuit board 250, and the output of the first sensor 240-1, which is supplied to the second circuit board 250, may be supplied to the circuit board 800.

The first holder 14A may be rotated or tilted by the electromagnetic force resulting from the interaction between the magnet 13A and the second coil 230-1.

For example, the first holder 14A may be rotated or tilted relative to the first reference axis 401 by the electromagnetic force resulting from the interaction between the magnet 13A and the second coil 230-1.

For example, the first reference axis 401 may be an axis that extends through the first and second couplers 51 and 61 parallel to the second axis (the X-axis).

The first sensor 240-1 may detect the intensity of the magnetic field of the sensing magnet 18A when the first holder 14A is rotated or moved by the electromagnetic force resulting from the interaction between the magnet 13A and the second coil 230-1, and may output an output signal corresponding to the result of the detection. Here, the output signal of the first sensor 240-1 may be of a voltage type or a current type.

Figure 6:
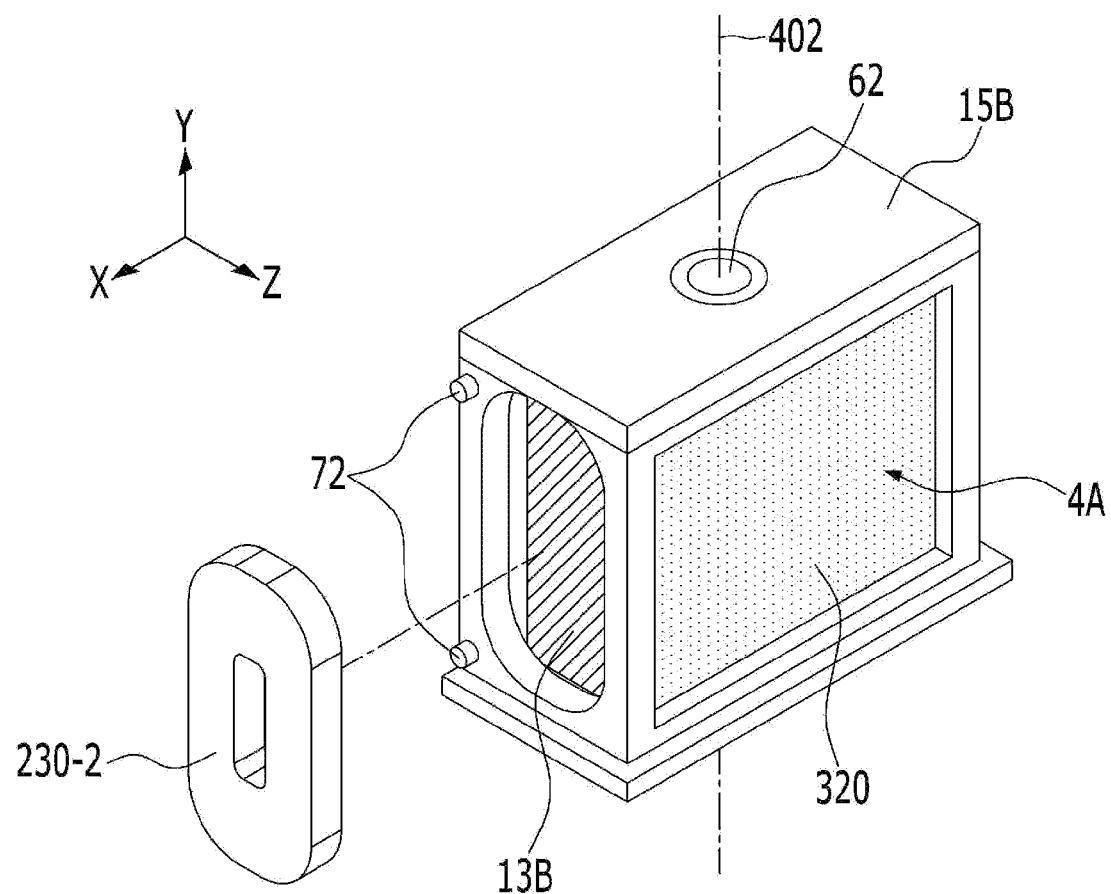
FIG. 6 is a perspective view of the second optical path changer shown in FIG. 1.
Figure 7A:
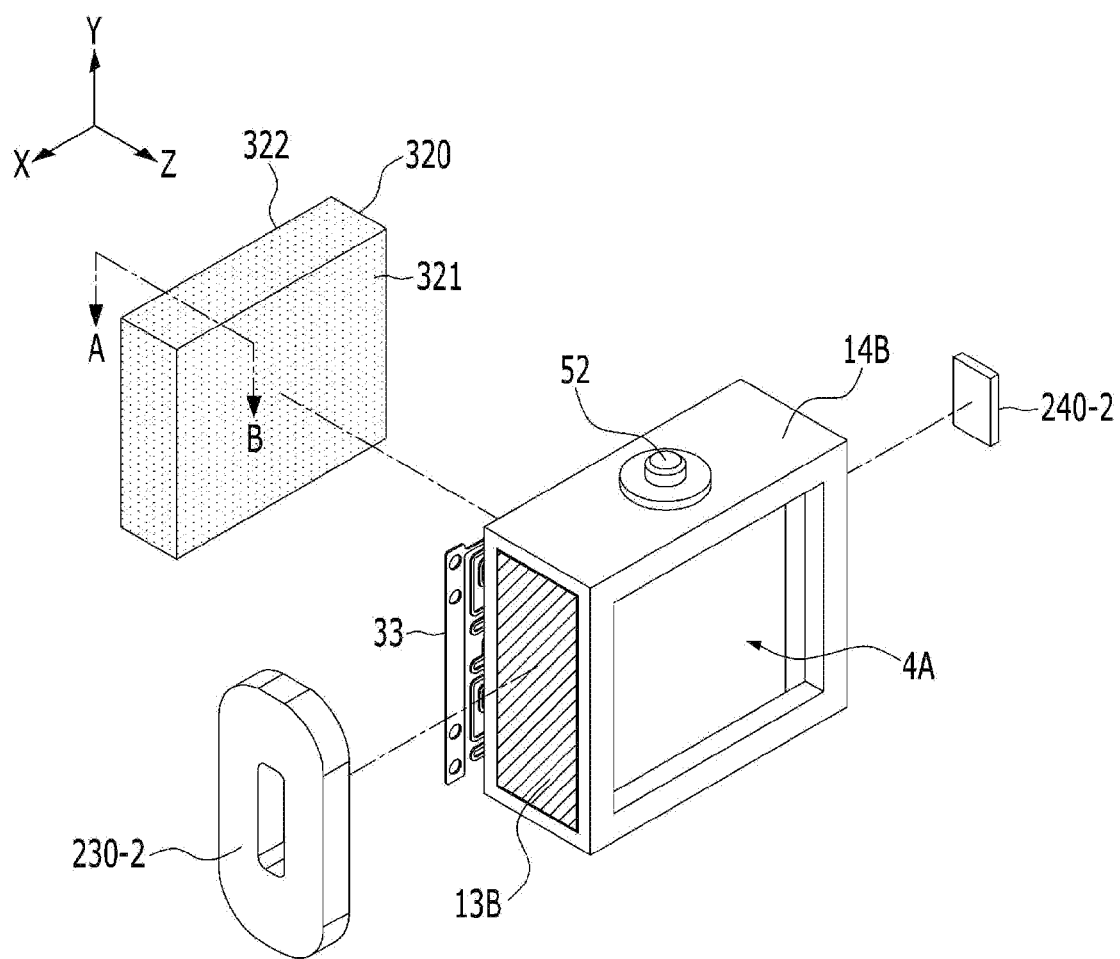
FIG. 7A is a perspective view of a second holder, a magnet, a third coil, a light transmission member, the elastic member, and a second sensor.
Figure 7B:
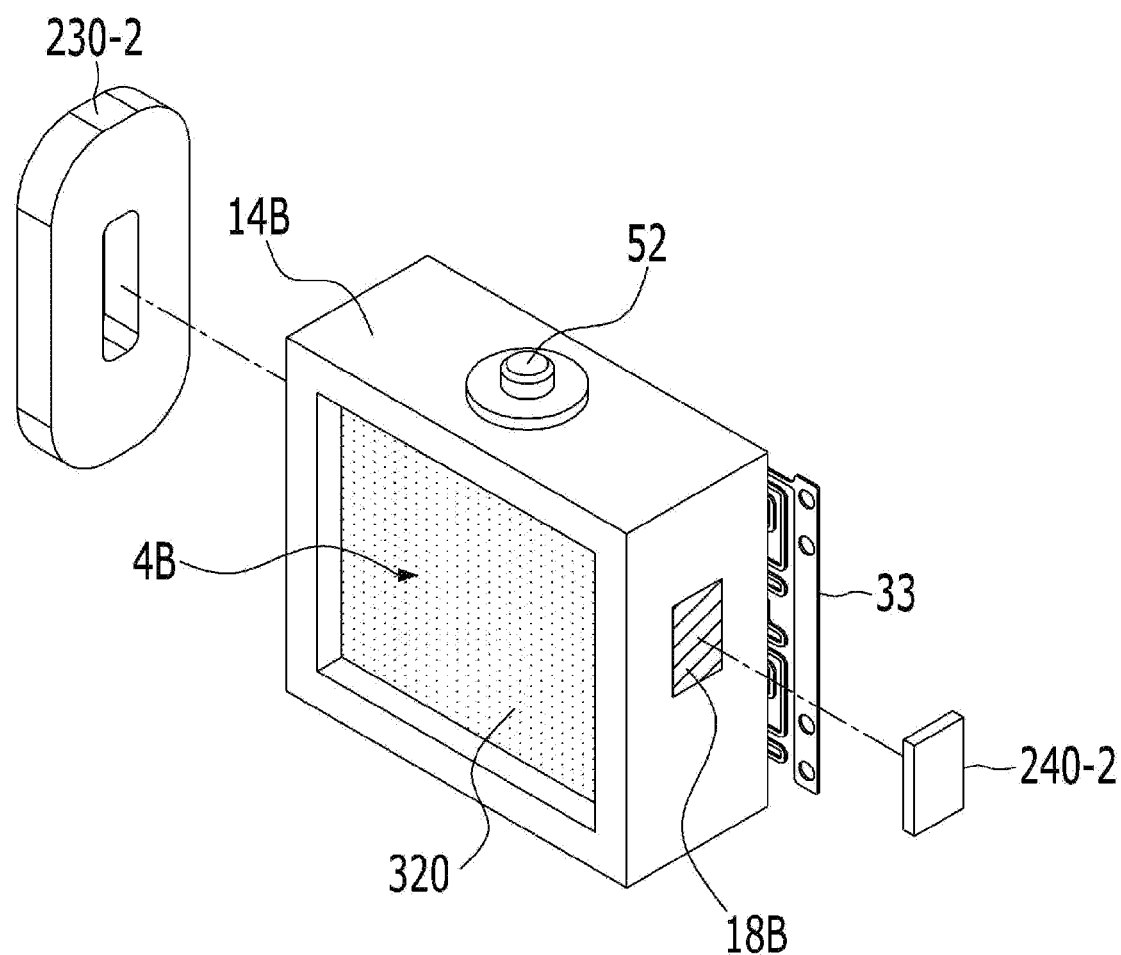
FIG. 7B is a perspective view of the second holder, the light transmission member, the third coil, the elastic member, the sensing magnet, and the second sensor, which are shown in FIG. 7A.
Figure 8B:
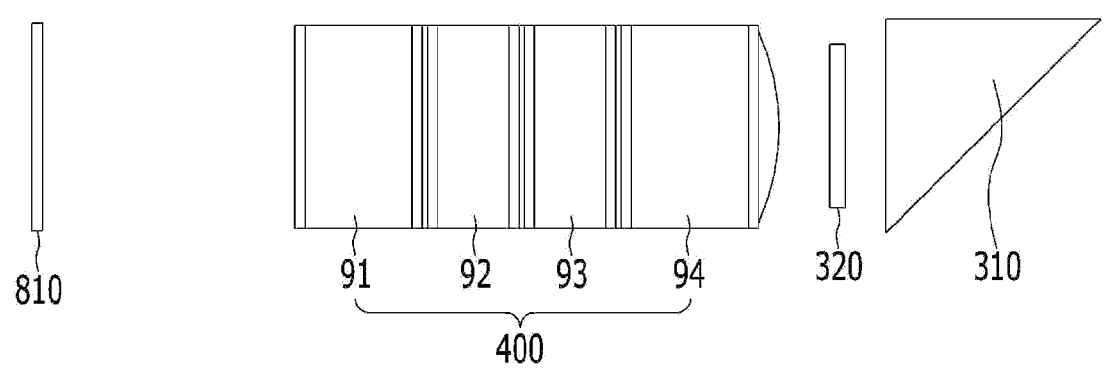
FIG. 8B is a side view of FIG. 8A.

FIG. 6 is a perspective view of the second optical path changer 10B shown in FIG. 1. FIG. 7A is a perspective view of a second holder 14B, a magnet 13B, the third coil 230-2, the light transmission member 320, an elastic member 33, and the second sensor 240-2. FIG. 7B is a perspective view of the second holder 14B, the light transmission member 320, the third coil 230-2, the elastic member 22, the sensing magnet 18B, and the second sensor 240-2, which are shown in FIG. 7A. FIG. 8A is a perspective view of the image sensor 810, the lens module 400, the reflective member 310, and the light transmission member 320, which are shown in FIG. 1. FIG. 8B is a side view of FIG. 8A.

Referring to FIGS. 6 to 8B, the second optical path changer 10B may include a second housing 16B, the second holder 14B, the light transmission member 320, the magnet 13B, and the third coil 230-2.

The second optical path changer 10B may include the elastic member 33, which is coupled to the second holder 14B and the second housing 15B. The elastic member 33 may flexibly support the second holder 14B with respect to the second housing 15B.

Although a single elastic member 33 is illustrated in FIGS. 6 and 7A, the disclosure is not limited thereto. In another embodiment, the second optical path changer 10B may include two or more elastic members. In a further embodiment, the elastic member 33 may be omitted from the second optical path changer 10B.

The elastic member 33 may include an inner portion coupled to the second holder 14B, an outer portion coupled to the second housing 15B, and a connector connecting the inner portion to the outer portion. The connector may include a bent portion, which is bent once or more.

The second optical path changer 10B may include the sensing magnet 18B and the second sensor 240-2 for OIS feedback operation. By means of the sensing magnet 18B and the second sensor 240-2, it is possible to detect displacement of the second holder 14B which is tilted or rotated with respect to the first axis (the Y-axis). For example, by means of the sensing magnet 18B and the second sensor 240-2, it is possible to detect displacement of the second holder 14B in the second axial direction (in the X-axial direction).

The light transmission member 320 may be disposed at the second holder 14B so as to allow light to be transmitted therethrough. For example, although the light transmission member 320 may be a prism, which allows light to be transmitted therethrough, the disclosure is not limited thereto. In another embodiment, the light transmission member 320 may be a lens.

Referring to FIG. 7A, for example, the light transmission member 320 may include a first surface 321 and a second surface 322, which faces the first surface 321 or is positioned opposite the first surface 321.

The first surface 321 may be an incident surface, and the second surface 322 may be an emitting surface.

In other words, the light that is incident on the first surface 321 of the light transmission member 320 may exit from the light transmission member 320 through the second surface 322.

For example, the light transmission member 320 may be a planar prism, which includes the first surface 321 and the second surface 322, which faces the first surface 321 and is parallel to the first surface 321.

For example, the light transmission member 320, that is, the planar prism, may include the first surface 321, which corresponds to or faces the emitting surface 8C of the reflective member 310, and the second surface 322, which faces the first surface 321 and is parallel to the first surface 321.

For example, the first surface 321 of the planar prism may be an incident surface, and the second surface 322 of the planar prism may be an emitting surface.

For example, the light transmission member 320 may include an upper surface disposed between the first surface and the second surface, a lower surface, which is disposed under the upper surface and is parallel to the upper surface, and two side surfaces, which are disposed between the upper surface and the lower surface and are parallel to each other.

For example, the light transmission member 320 may be a planar prism, which includes the incident surface, that is, the first surface, which is perpendicular to the optical axis OA, and the emitting surface, that is, the second surface, which is perpendicular to the first surface.

For example, although the light transmission member 320 may be configured to have a hexahedral shape, for example, a rectangular parallelepiped shape or a cubic shape, the disclosure is not limited thereto.

The surface area of the emitting surface 8C of the reflective member 310 may be equal to or larger than the surface area of the first surface 321 of the light transmission member 320.

The second holder 14B may be provided with a seating portion, to which the light transmission member 320 is disposed or mounted.

For example, the second holder 14B may have a first opening 4A, through which the first surface 321 of the light transmission member 320 is exposed, and a second opening 4B, through which the emitting surface 321 of the light transmission member 320 is exposed.

For example, the first opening 4A may be formed in the first side portion of the second holder 14B, and the second opening 4B may be formed in the second side portion of the second holder 14B, which faces the first side portion. For example, the first side portion and the second side portion of the second holder 14B may face each other in the optical-axial direction (for example, in the Z-axial direction).

The first surface 321 of the light transmission member 320, which is disposed at the second holder 14B, may face the emitting surface 8C of the reflective member 310, and the second surface 322 of the light transmission member 320, which is disposed at the second holder 14B, may face the lens module 400.

The outer surface of the second holder 14B may be provided with a first coupler 52.

For example, the first coupler 52 may be disposed at the upper portion (for example, the upper surface) and the lower portion (for example, the lower surface) of the second holder 14B, which face each other or are positioned opposite each other.

The second holder 14B may be disposed in the second housing 15B.

The second holder 14B may be rotated or tilted in the second housing 15B around an axis 402 perpendicular to the optical axis OA.

The second housing 15B may have a first opening corresponding to the first opening 4A in the second holder 14B and a second opening corresponding to the second opening 4B in the second holder 14B.

For example, the first opening in the second housing 15B may be formed in the first side portion of the second housing 15B, and the second opening in the second housing 15B may be formed in the second side portion of the second housing 17B. For example, the first and second side portions of the second housing 15B may face each other in the optical-axial direction (in the Z-axial direction).

The second housing 15B may expose the first surface 321 and the second surface 322 of the light transmission member 320 disposed at the second holder 14B.

The second housing 15B may include a second coupler 62, which is coupled to the first coupler 52 of the second holder 14B.

For example, although the second coupler 62 may be provided at the upper portion (for example, the upper surface) and the lower portion (for example, the lower surface) of the second housing 15B, which face each other or are positioned opposite each other, the disclosure is not limited thereto. Although the first coupler 52 of the second holder 14B and the second coupler 62 of the second housing 15B may be coupled to each other in a fitting manner, the disclosure is not limited thereto.

Although the first coupler 52 of the second holder 14B has the form of a protrusion and the second coupler 62 of the second housing 15B has the form of a hole or groove in FIGS. 6 and 7A, the disclosure is not limited thereto. In another embodiment, the first coupler 52 of the second holder 14B may have the form of a hole or groove, and the second coupler 62 of the second housing 15B may have the form of a protrusion.

The second housing 15B may include a coupling protrusion 72, which is coupled to a hole 82 in the second circuit board 250.

Although the magnet 13B may be disposed at the second holder 14B and the third coil 230-2 may be disposed at the second housing 15B, the disclosure is not limited thereto. In another embodiment, the magnet 13B may be disposed at the second housing 15B, and the third coil 230-2 may be disposed at the second holder 14B.

For example, the third coil 230-2 may be disposed at the third side portion of the second housing 15B.

For example, the third coil 230-2 may be disposed in a seating portion formed in the third side portion of the second housing 15B. Although the seating portion may have the form of a hole, a through hole, or a groove, the disclosure is not limited thereto. In another embodiment, the seating portion may have the form of a protrusion. Here, the third side portion of the second housing 15B may be a side portion, which is disposed between the first side portion and the second side portion of the second housing 15B so as to connect the first side portion to the second side portion.

The magnet 13B may be disposed at the third side portion of the second holder 14B.

For example, the magnet 13B may be disposed in a groove formed in the third side portion of the second holder 14B. Here, the third side portion of the second holder 14B may be a side portion that is disposed between the first and second side portions of the second holder 14B so as to connect the first side portion to the second side portion.

The second sensor 240-2 may be disposed at the second housing 15B, and the sensing magnet 18B may be disposed at the second holder 14B so as to correspond to or face the second sensor 240-2.

For example, the second sensor 240-2 may be disposed at the fourth side portion of the second housing 15B, and the sensing magnet 18B may be disposed at the fourth side portion of the second holder 14B so as to correspond to or face the second sensor 240-2. The fourth side portion of the second housing 15B may be a side portion that faces the third side portion of the second housing 15B or is positioned opposite the third side portion, and the fourth side portion of the second holder 14B may be a side portion that faces the third side portion of the second holder 14B or is positioned opposite the third side portion.

In another embodiment, the second sensor 240-2 may be disposed at the second holder 14B, and the sensing magnet 18B may be disposed at the second housing 15B.

The third coil 230-2 may be conductively connected to the second circuit board 250 so as to allow a drive signal from the second circuit board 250 to be applied to the third coil 230-2. The second circuit board 250 may be conductively connected to the circuit board 800 so as to receive a drive signal for the third coil 230-2 from the circuit board 800.

The second sensor 240-2 may be conductively connected to the second circuit board 250 so as to receive a drive signal or drive power from the second circuit board 250. The second circuit board 250 may receive a drive signal or drive power for the second sensor 240-2 from the circuit board 800.

The output of the second sensor 240-2 may be supplied to the second circuit board 250, and the output of the second sensor 240-2, which is supplied to the second circuit board 250, may be supplied to the circuit board 800.

Referring to FIG. 6, the second holder 14B may be tilted or rotated with respect to the second reference axis 402 by the electromagnetic force resulting from the interaction between the magnet 13B and the third coil 230-2.

For example, the second holder 14B may be tilted or rotated with respect to the second reference axis 402 by the electromagnetic force resulting from the interaction between the magnet 13B and the third coil 230-2. The second reference axis 402 may be an axis that extends through the first and second couplers 52 and 62 parallel to the first axis (the Y-axis). Each of the first reference axis 401 and the second reference axis 402 may be perpendicular t to the optical axis, and the first reference axis 401 and the second reference axis 402 may intersect each other orthogonally.

The second sensor 240-2 may detect the intensity of the magnetic field of the sensing magnet 18B when the second holder 14B is rotated or tilted by the electromagnetic force resulting from the interaction between the magnet 13B and the third coil 230-2, and may output an output signal corresponding to the result of the detection. Here, the output signal of the second sensor 240-2 may be of a voltage type or a current type.

Although each of the first sensor 240-1 and the second sensor 240-2 may be embodied as a Hall sensor alone, the disclosure is not limited thereto. Each of the first sensor 240-1 and the second sensor 240-2 may be embodied as a driver IC including a Hall sensor.

The circuit board 250 may be coupled to the first housing 15A and the second housing 15B.

For example, the circuit board 250 may include a first board 25-1, a second board 25-2, and a third board 25-3.

For example, the first board 25-1 may be coupled to the third coil 230-2, and may be conductively connected to the third coil 230-2. For example, the second board 25-2 may be both physically and conductively coupled to the second coil 230-1 and the first sensor 240-1. For example, the third board 25-3 may be coupled to the second sensor 240-2, and may be conductively connected to the second sensor 240-2.

Although the first to third boards 25-1 to 25-3 may be connected to one another, the disclosure is not limited thereto. In another embodiment, at least one of the first to third boards 25-1 to 25-3 may be separated from the remaining ones.

Figure 9A:
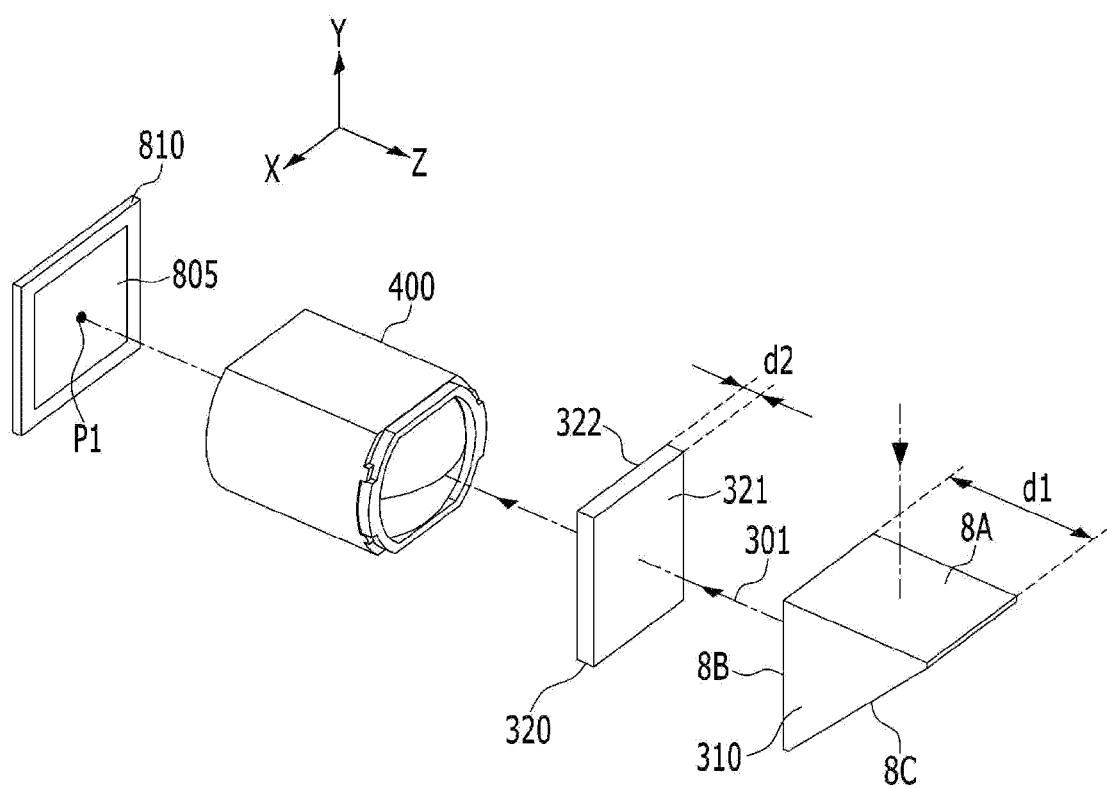
FIG. 9A illustrates a first position of an image, which is formed on the image sensor by the reference light that has passed through the reflective member and the light transmission member in the reference state.
Figure 9B:
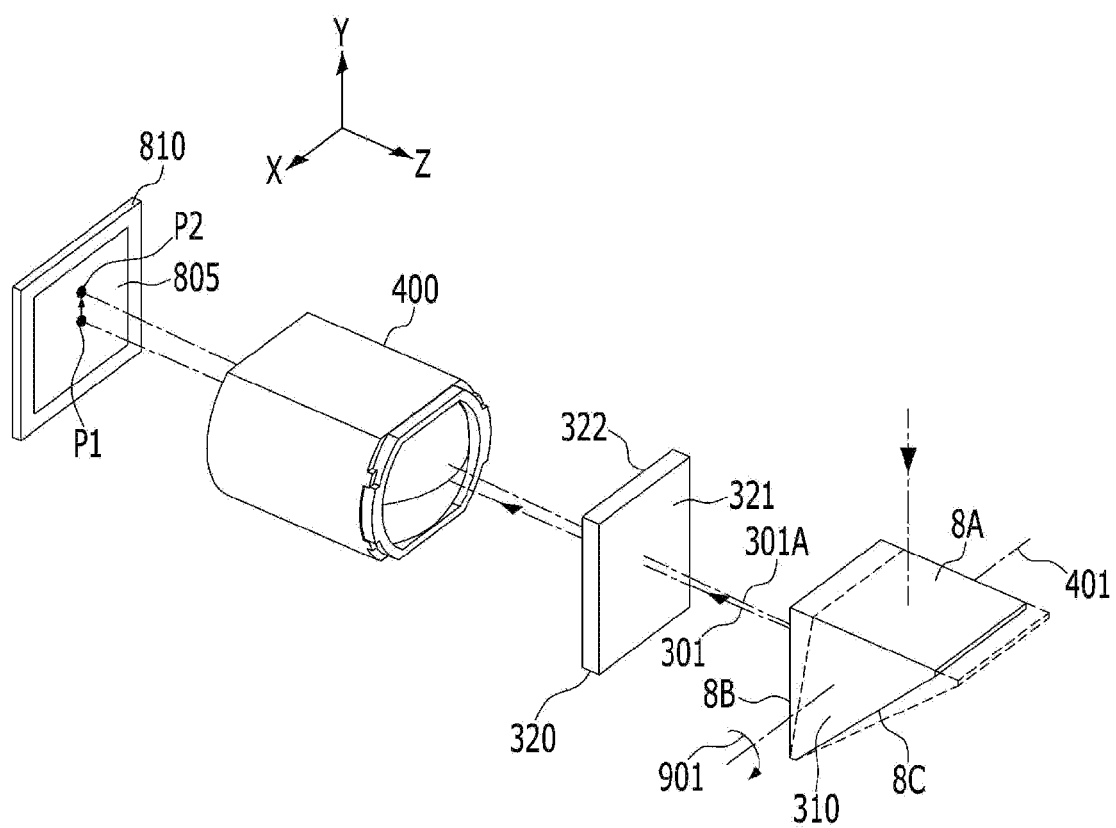
FIG. 9B illustrates a second position of an image, which is formed on the image sensor by a first light when the reflective member is rotated in a positive direction.
Figure 9C:
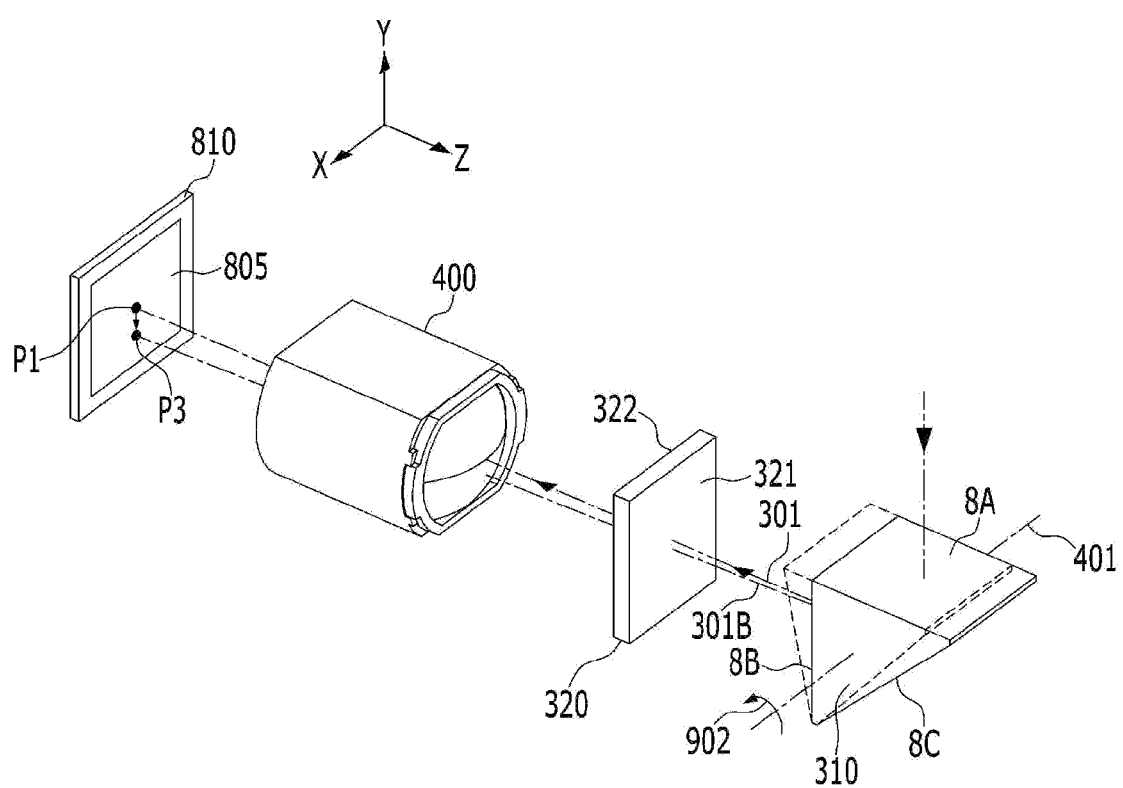
FIG. 9C illustrates a third position of an image, which is formed on the image sensor by a second light when the reflective member is rotated in a negative direction.
Figure 9D:
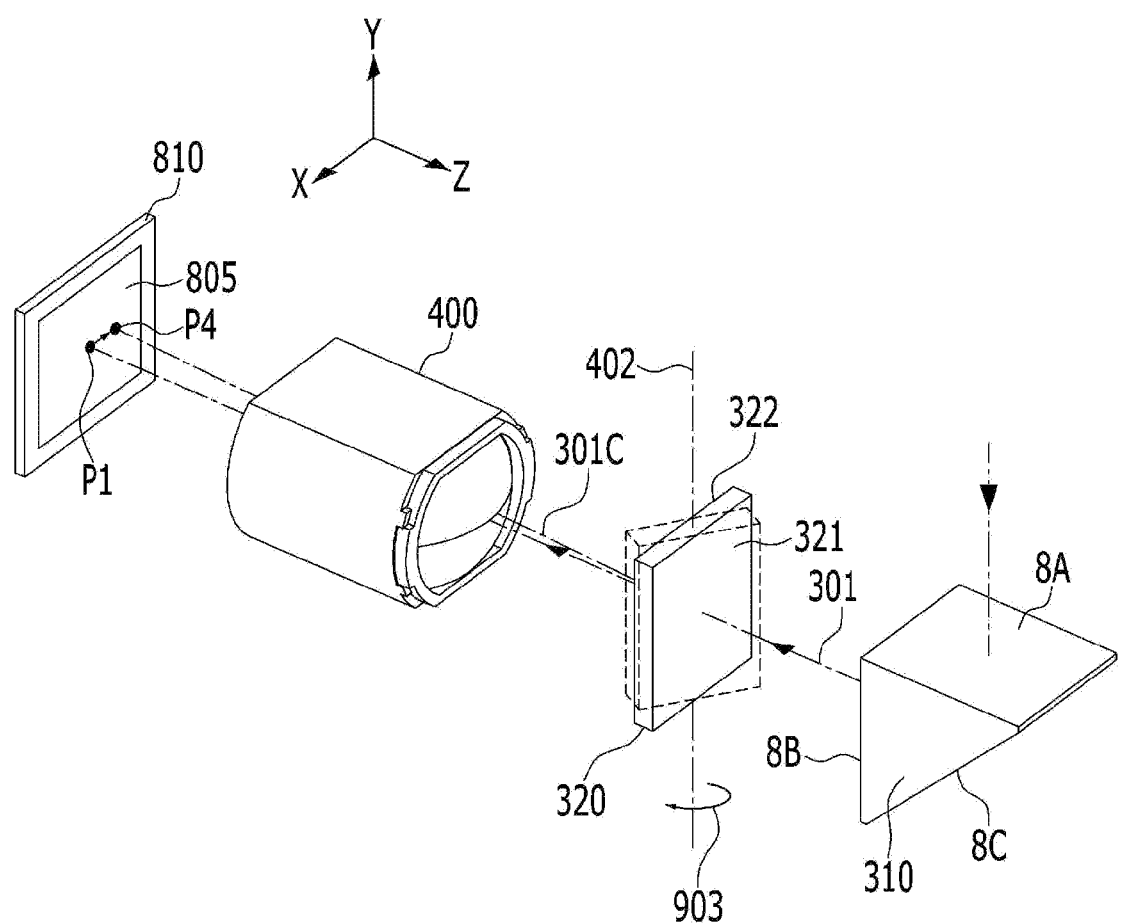
FIG. 9D illustrates a fourth position of an image, which is formed on the image sensor by a third light when the light transmission member is rotated in a positive direction.
Figure 9E:
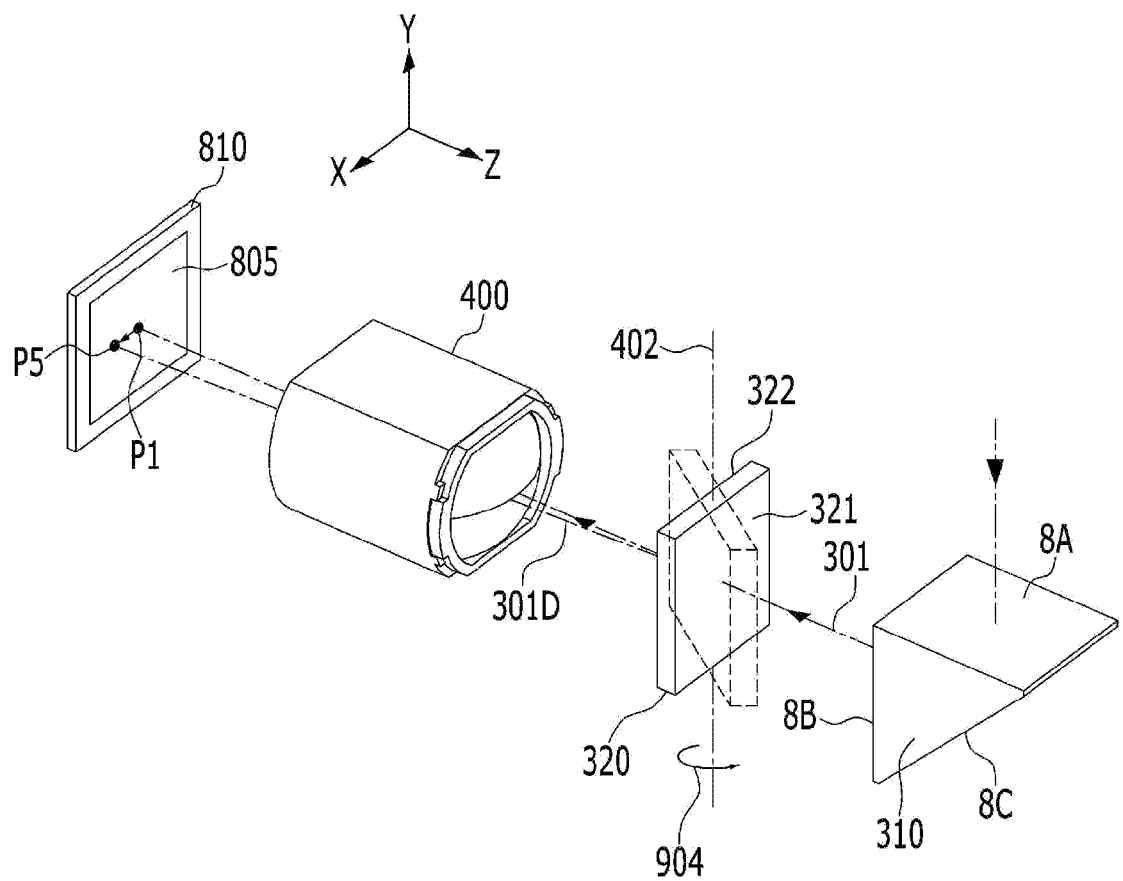
FIG. 9E illustrates a fifth position of an image, which is formed on the image sensor by a fourth light when the light transmission member is rotated in a negative direction.

FIG. 9A illustrates a first position P1 of an image, which is formed on the image sensor 810 by the reference light 301 that has passed through the reflective member 310 and the light transmission member 310 in the reference state. FIG. 9B illustrates a second position P2 of an image, which is formed on the image sensor 810 by a first light 301A when the reflective member 310 is rotated in a positive direction (901). FIG. 9C illustrates a third position P3 of an image, which is formed on the image sensor 810 by a second light 301B when the reflective member 310 is rotated in a negative direction (902). FIG. 9D illustrates a fourth position P4 of an image, which is formed on the image sensor 810 by a third light 301C when the light transmission member 320 is rotated in a positive direction (903). FIG. 9E illustrates a fifth position P5 of an image, which is formed on the image sensor 810 by a fourth light 301D when the light transmission member 320 is rotated in a negative direction (904).

The reference state may be a state in which the first holder 14A and the second holder 14B are not moved because a drive signal is not applied to the second coil 230-1 of the first optical path changer 10A or to the third coil 230-2 of the second optical path changer 10B.

In FIGS. 9A to 9E, although the reflective member 310 is embodied as a "first prism" and the light transmission member 320 is embodied as a "second prism", the disclosure is not limited thereto.

Referring to FIG. 9A, the image sensor 810, the lenses of the lens module 400, the second prism 320, and the first prism 310 may be sequentially arranged in the direction of the optical axis OA (for example, in the Z-axial direction). Consequently, it is possible to reduce the length L1 (see FIGS. 1 and 16) of the camera module 1000 in the second axial direction (for example, in the X-axial direction) perpendicular to the optical axis OA.

Furthermore, the length d2 of the second prism 320 in the direction of the optical axis OA may be less than the length d1 of the first prism 310 in the direction of the optical axis OA (for example, in the Z-axial direction) (d2<d1).

Here d1 may be the length of the incident surface 8A of the first prism 310 in the optical-axial direction. For example, d1 may be the minimum length of the incident surface 8A of the first prism 310 in the optical-axial direction.

Alternatively, for example, d1 may be the maximum length of the first prism 310 in the optical-axial direction.

For example, d2 may be the distance between the first surface 321 and the second surface 322 of the second prism 320 in the optical-axial direction.

As illustrated in FIG. 1, because d2 is less than d1 (d2<d1), the length DL2 of the second optical path changer 10B in the optical-axial direction may be less than the length DL1 of the first optical path changer 10A in the optical-axial direction (DL2<DL1). In another embodiment, DL2 may be equal to DL1.

Because the second prism 320 having the form of a flat surface or a flat plate is provided in order to change the path of the light incident on the image sensor toward a direction perpendicular to the direction of the optical axis OA and d2 is less than d1 (d2<d1), the embodiment is capable of reducing the length of the camera module 1000 in the direction of the optical axis OA.

As illustrated in FIG. 9B, when the first prism 310 is rotated in the positive direction (901) from the reference state, the light reflection angle of the first prism 310 may be changed. Consequently, the first light 301A emitted from the first prism 310 may be tilted in the positive (+) Y-axial direction from the reference light 301. As a result, the image formed on the image sensor 810 may be shifted to the second position P2 from the first position P1.

As illustrated in FIG. 9C, when the first prism 310 is rotated in the negative direction (902) from the reference state, the light reflection angle of the first prism 310 may be changed. Consequently, the second light 301B emitted from the first prism 310 may be tilted in the negative (−) Y-axial direction from the reference light 301. As a result, the image formed on the image sensor 810 may be shifted to the third position P3 from the first position P1.

For example, although the positive rotation (901) of the first prism 310 may be clockwise rotation about the first reference axis 401 and the negative rotation (902) of the first prism 310 may be counterclockwise rotation about the first reference axis 401, the disclosure is not limited thereto. Here, the positive direction may be alternatively referred to as a "forward direction", and the negative direction may be alternatively referred to as a "reverse direction".

As illustrated in FIG. 9D, when the second prism 320 is rotated in the positive direction (903) from the reference state, the third light 301C emitted from the second prism 320 may be tilted in the negative (−) X-axial direction from the reference light 301. Consequently, the image formed on the image sensor 810 may be shifted to the fourth position P4 from the first position P1.

As illustrated in FIG. 9E, when the second prism 320 is rotated (904) in the negative direction from the reference state, the fourth light 301D emitted from the second prism 320 may be tilted in the positive (+) Y-axial direction from the reference light 301. Consequently, the image formed on the image sensor 810 may be shifted to the fifth position P5 from the first position P1.

When the first prism 310 is rotated in the positive direction or in the negative direction, the light reflection angle of the first prism 310 may be changed. Accordingly, the emission angle of the light emitted from the first prism 310 may be changed, and thus the position of the image formed on the image sensor 810 may be shifted in the Y-axial direction. Furthermore, when the second prism 320 is rotated in the positive direction or in the negative direction, the optical refraction angle of the second prism 320 may be changed, and thus the position of the image formed on the image sensor 810 may be shifted in the X-axial direction.

By the movement (for example, the rotation) of the first prism 310 and the movement (for example, the rotation) of the second prism 320, the path of the light introduced into the lens module 400 may be moved on a plane (for example, the X-Y plane) perpendicular to the optical axis OA, thereby making it possible to move the image formed on the image sensor 810 in the X-axial direction and/or in the Y-axial direction.

By controlling the movement (for example, the rotation) of the first prism 310 and the movement (for example, the rotation) of the second prism 320, the embodiment is capable of correcting blur of an image or shaking of a moving image, which is caused when the camera module is shaken due to user's handshaking while capturing an image or a moving image.

Specifically, the controller is capable of performing an optical image stabilization (OIS) operation of correcting handshaking by controlling drive signals supplied to the second and third coils 230-1 and 230-2.

Furthermore, the controller is capable of detecting displacement of the first prism 310 and displacement of the second prism 320 based on the output of the first sensor 240-1 and the output of the second sensor 240-2, and is capable of performing an accurate OIS operation by controlling the tilting of the first prism 310 and the tilting of the second prism 320 based on the detected displacements of the first and second prisms 310 and 320.

Conventionally, because the degree of shaking of an apparatus (for example, a portable terminal), in which a camera module having a zoom function is incorporated, may increase in proportion to the extent of magnification, it is essential to incorporate an OIS function into the camera module. Because the number of lenses that are stacked in the lens module of the camera module increases and the space required for movement of the lenses increases in order to realize a zoom function, the thickness of the apparatus (for example, the portable apparatus) may increase.

In contrast, by changing the optical path through the reflective member 310 of the first optical path changer 10A and by sequentially arranging the image sensor 810, the lenses of the lens module 400, the second prism 320 of the second optical path changer 10B, and the first prism 310 of the second optical path changer 10A in a direction (for example, in the Z-axial direction in FIG. 16) perpendicular to the thickness direction (the Y-axial direction in FIG. 16) of the portable terminal, the embodiment is capable of reducing the thickness t of the apparatus (for example, the portable terminal 200A shown in FIG. 16) in which the camera module 1000 is incorporated.

Furthermore, in order to perform an OIS function, the camera module needs a structure configured to change the optical path toward a direction perpendicular to the optical axis OA. Due to this structure for realizing the OIS function, the size of the camera module may increase.

Because the second optical path changer 10B changes the optical path toward a direction (for example, the X-axial direction) perpendicular to the optical axis through the second prism 10B having a flat shape, and because d2 is less than d1 (d2<d1), it is possible to reduce the length of the camera module in the optical-axial direction, and thus it is possible to eliminate restrictions on the space required to mount the camera module to the apparatus (for example, the portable terminal 200A).

Figure 10:
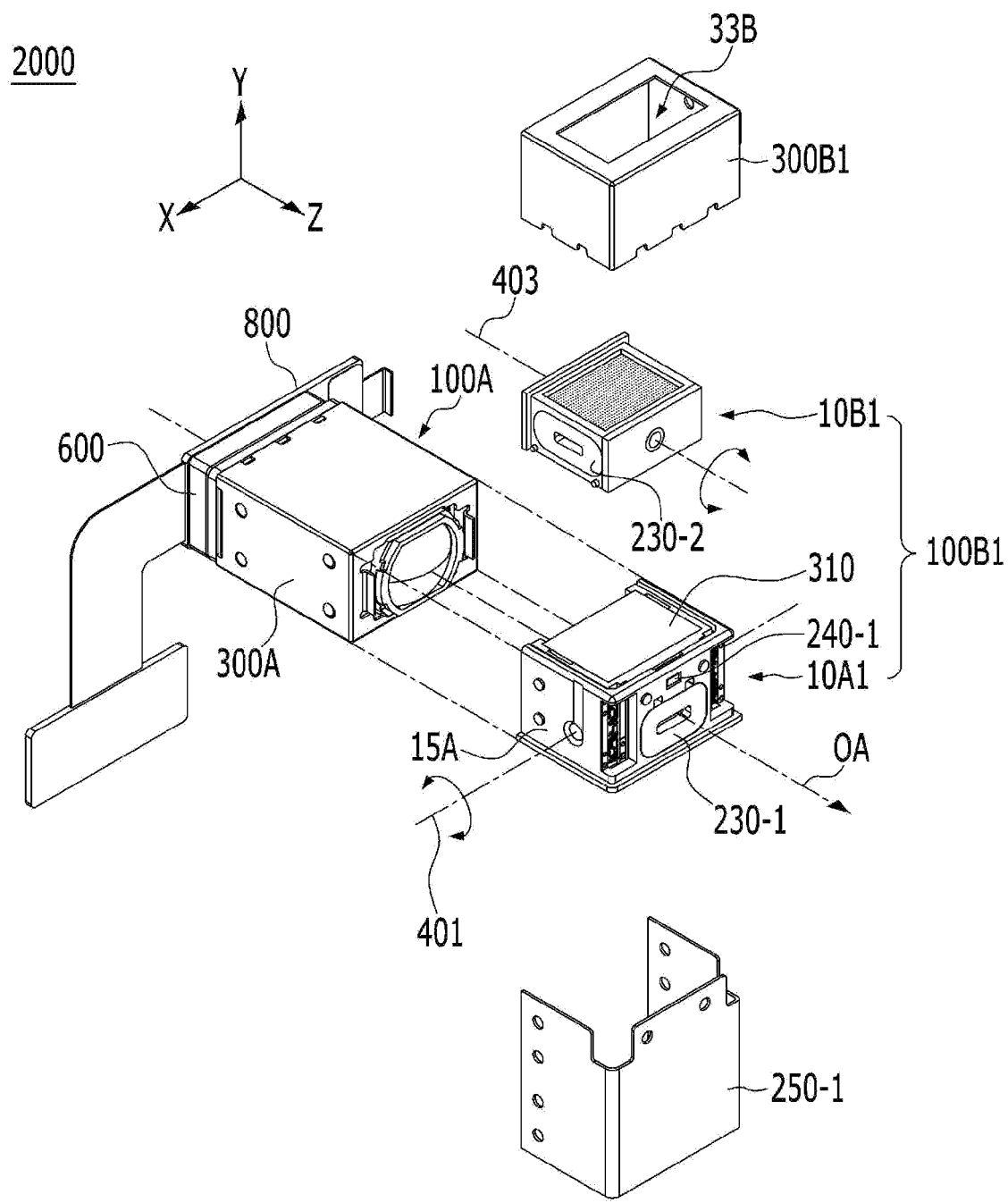
FIG. 10 is a perspective view of a camera module according to another embodiment.
Figure 11:
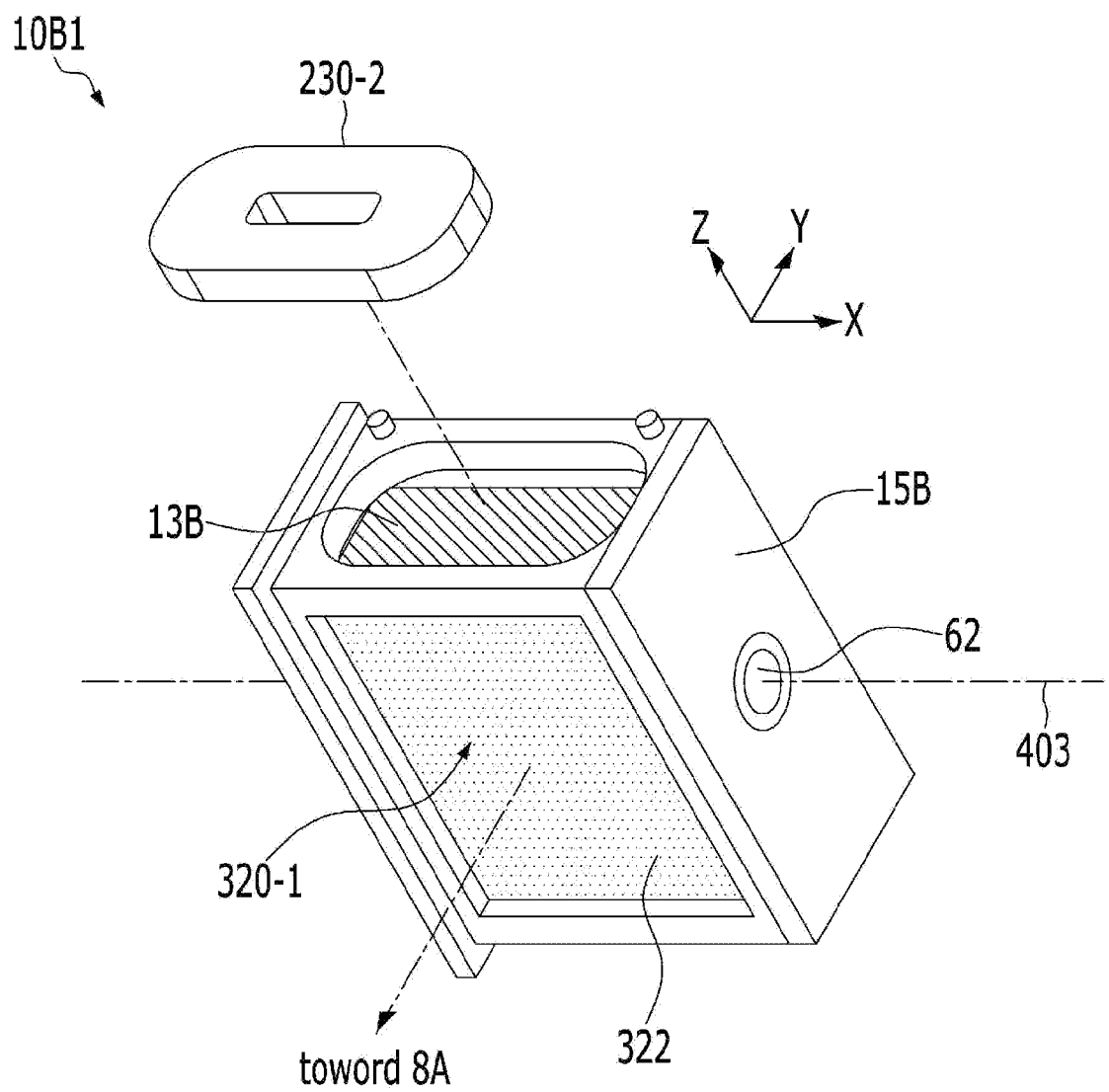
FIG. 11 is a perspective view of the second optical path changer shown in FIG. 10.
Figure 12:
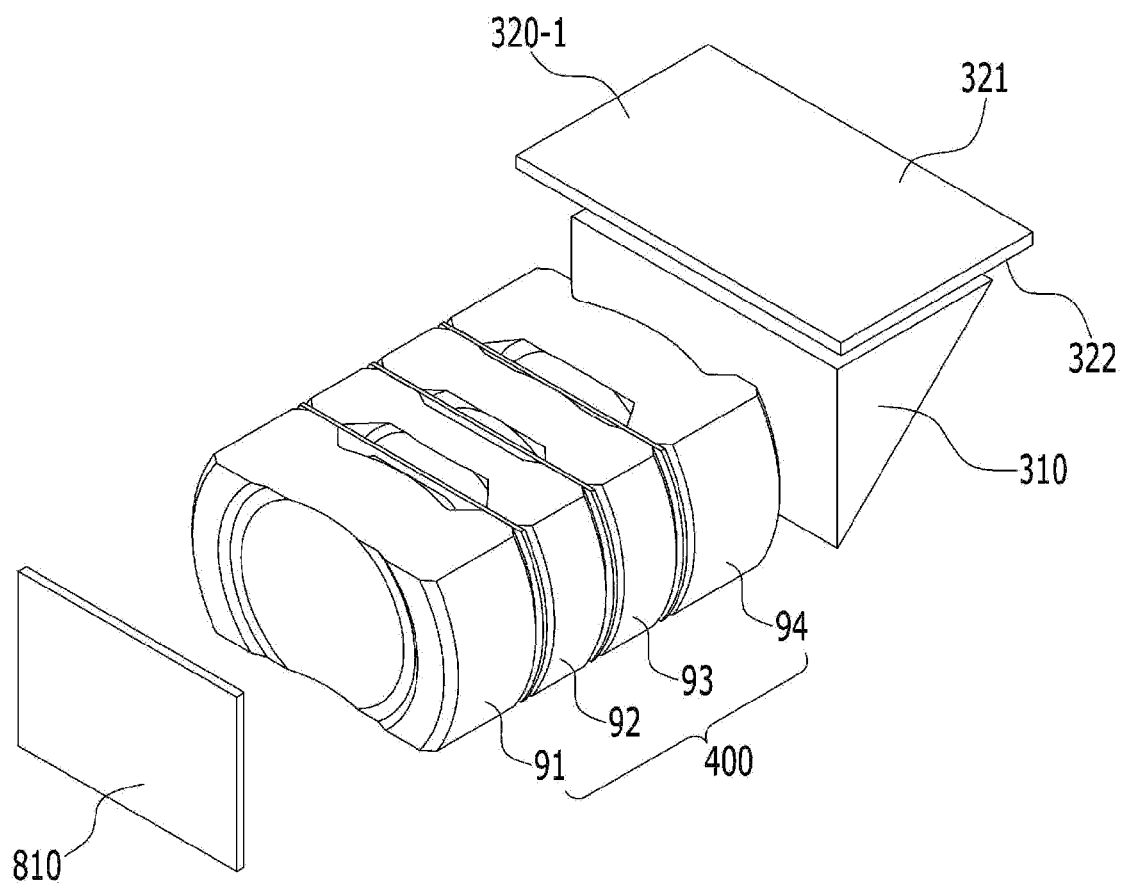
FIG. 12 is a perspective view of the image sensor, the lens module, the reflective member, and the light transmission member according to the embodiment shown in FIG. 10.

FIG. 10 is a perspective view of a camera module 2000 according to another embodiment. FIG. 11 is a perspective view of the second optical path changer 10B1 shown in FIG. 10. FIG. 12 is a perspective view of the image sensor 810, the lens module 400, the reflective member 320, and the light transmission member 310 according to the embodiment shown in FIG. 10.

In FIGS. 10 to 12, the same reference numerals as those in FIGS. 1, 6, 8A and 8B denote the same components, and a description thereof is omitted or is given briefly.

Referring to FIGS. 10 to 12, the camera module 2000 may include the circuit board 800, the image sensor 810, the sensor base 600, the filter 610, the first movable unit 100A, and a second movable unit 100B1.

The camera module 2000 shown in FIG. 10 is a modification of the camera module 1000 shown in FIG. 1.

Specifically, the second movable unit 100B1 shown in FIG. 10 is constructed such that the second optical path changer 10B shown in FIG. 1 is positioned in front of the incident surface 8A of the first optical path changer 10A.

The first optical path changer 10A1 shown in FIG. 10 may have the same configuration as that of the first optical path changer 10A shown in FIG. 1, and the second optical path changer 10B1 shown in FIG. 1 may have the same configuration as that of the second optical path changer 10B shown in FIG. 1. The description of the first optical path changer 10A may be applied to the first optical path changer 10A1 shown in FIG. 10 with or without modification, and the description of the second optical path changer 10B may be applied to the second optical path changer 10B1 shown in FIG. 10 with or without modification.

However, because the second optical path changer 10B1 is positioned in front of the incident surface 8A of the first optical path changer 10A1 in the embodiment shown in FIG. 10, the emitting surface 8C of the first optical path changer 10A1 may correspond to or face the lens module 400 in the optical-axial direction.

As illustrated in FIG. 11, the incident surface 8A of the first prism 310 of the first optical path changer 10A1 may correspond to or face the second surface 322 of the second prism 320-1 of the second optical path changer 10B1 in a direction perpendicular to the optical axis OA (for example, in the Y-axial direction).

The area of the second surface 322 of the second prism 320-1 may be equal to or larger than the area of the incident surface 8A of the first prism 310.

The cameral module 2000 may further include the first cover member 300A and a second cover member 300B1. The second cover member 300B1 may have an opening 33B through which the first surface 321 of the second prism 320-1 of the second optical path changer 10B1 is exposed. The second cover member 300B1 may accommodate therein the second movable unit 100B 1.

The description of the second prism 320 shown in FIGS. 7A and 7B may be applied to the second prism 320-1 shown in FIG. 10 with or without modification.

The second movable unit 100B1 may further include a second circuit board 250-1, which is conductively connected to the first optical path changer 10A1 and the second optical path changer 10B1. Although the configuration of the second circuit board 250-1 is different from the configuration of the second circuit board 250 shown in FIG. 1, the description of the second circuit board 250 may be applied to the second circuit board 250-1 with or without modification.

FIG. 12 illustrates the state of the second prism 320-1 and the first prism 310 in the reference state. The description of the reference state shown in FIG. 8A may be applied to the reference state shown in FIG. 12 with or without modification.

Figure 13A:
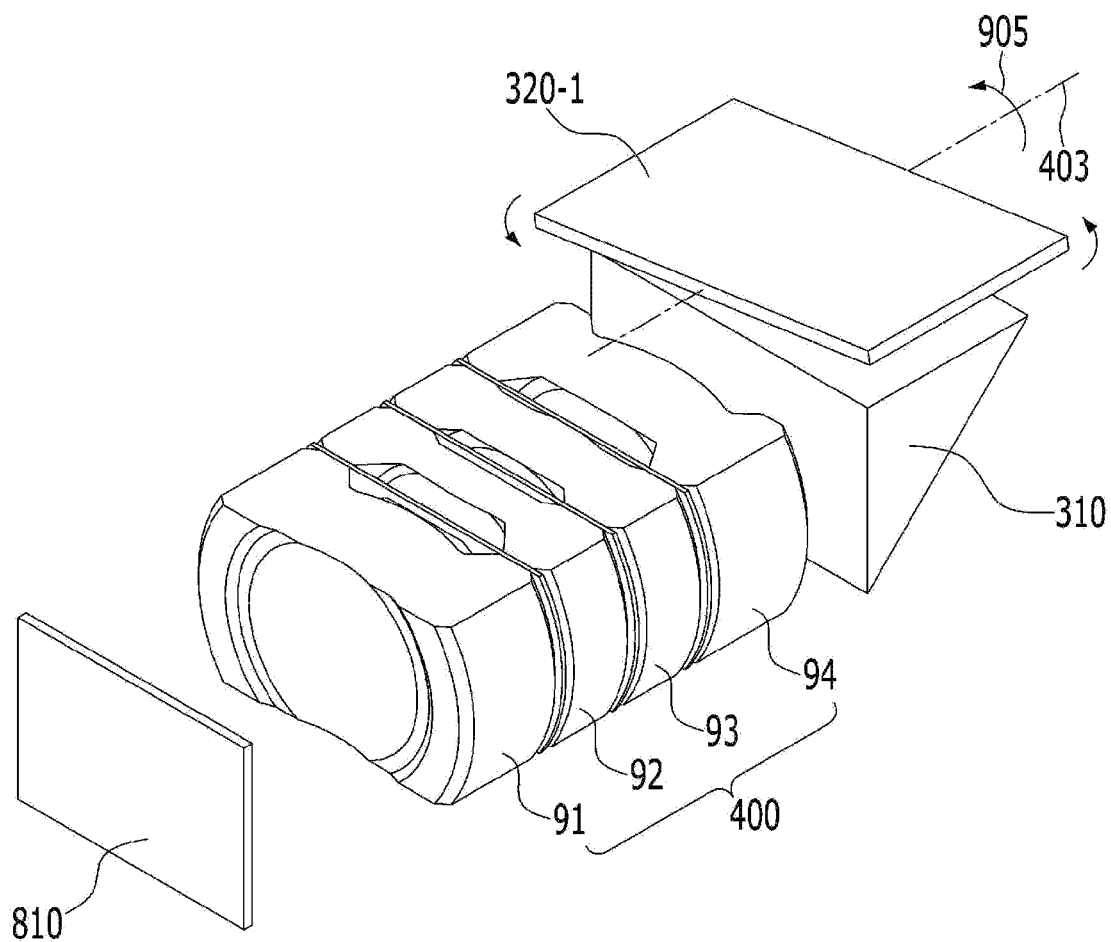
FIG. 13A illustrates the rotation of the second prism in the positive direction.
Figure 13B:
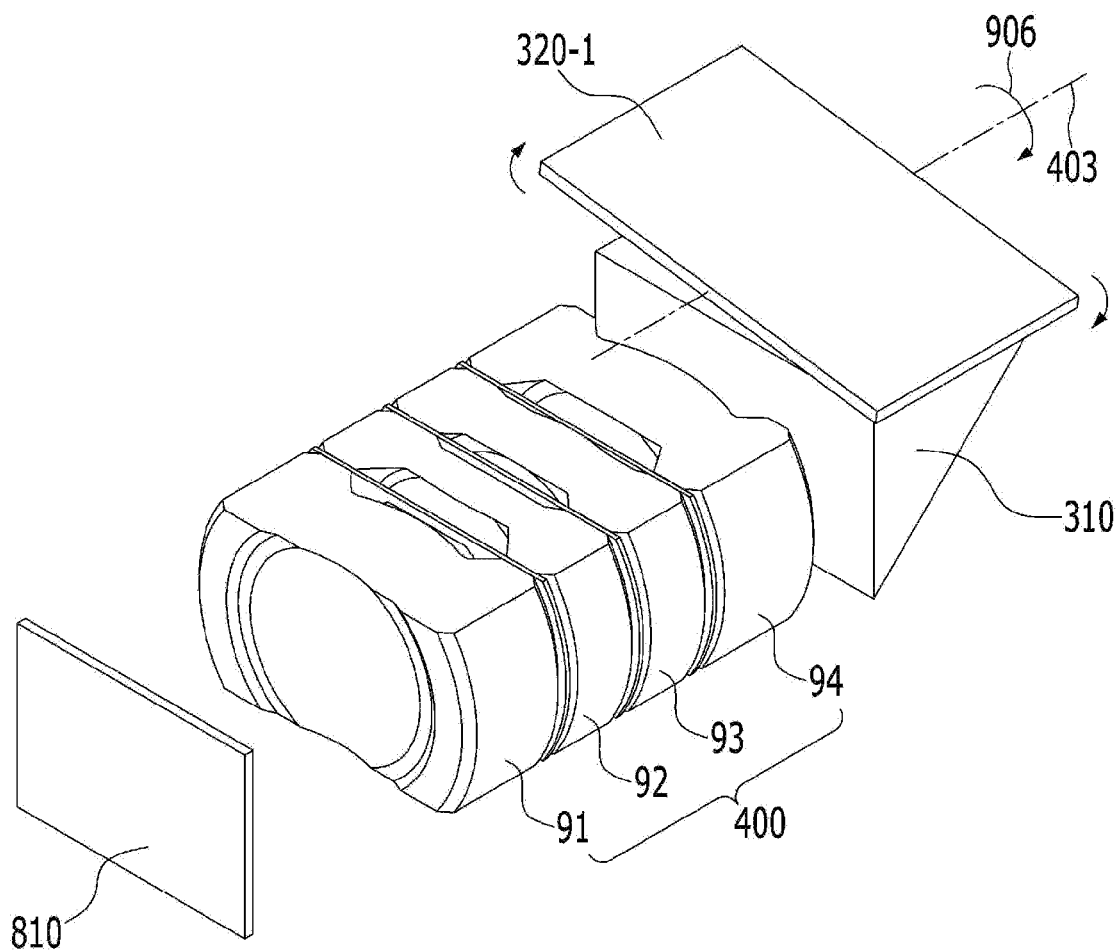
FIG. 13B illustrates the rotation of the second prism in the negative direction.

FIG. 13A illustrates the rotation (905) of the second prism 320-1 in the positive direction. FIG. 13B illustrates the rotation (906) of the second prism 320-1 in the negative direction.

Referring to FIGS. 13A and 13B, the second prism 320-1 may be rotated about a third reference axis 403 by the interaction between the third coil 230-2 and the magnet 13b.

The third reference axis 403 may be an axis that extends through the first coupler 52 of the second holder 14b and the second coupler 62 of the second housing 15B parallel to the optical axis OA or the Z-axis.

By rotation of the second prism 320-1 in the positive or negative direction (905 or 906), the path of the light emitted from the second prism 320 may be changed, whereby the image formed on the image sensor 810 through the second prism 320-1, the first prism 310, and the lens module may be shifted or moved in a direction (for example, in the X-axial direction) perpendicular to the optical axis OA.

For example, when the second prism 320-1 is rotated in the positive direction (905) shown in FIG. 13A about the third reference axis 403, the position of the image may be shifted to P5 from P1, as illustrated in FIG. 9E. Meanwhile, when the second prism 320-1 is rotated in the negative direction (906) shown in FIG. 13B about the third reference axis 403, the position of the image may be shifted to P4 from P1, as illustrated in FIG. 9D.

The description of positional variation of the image on the image sensor 810 according to a change in the optical path by the first prism 310 and the second prism 320 for an OIS operation, which is illustrated in FIGS. 9A to 9D, may be applied to the embodiment shown in FIGS. 10 and 11, with the exception of the position of the second optical path changer 10B1. The camera module 2000 may perform the OIS operation through the first and second optical path changers 10A1 and 10B 1.

In terms of the path of incident light, the second optical path changer 10B1 shown in FIG. 10 may alternatively be referred to as a "first optical path changer", and the second prism 320-1 may alternatively be referred to as a "first prism". Furthermore, the first optical path changer 10A1 shown in FIG. 10 may alternatively be referred to as a "second optical path changer", and the first prism 310 may alternatively be referred to as a "second prism".

Figure 14A:
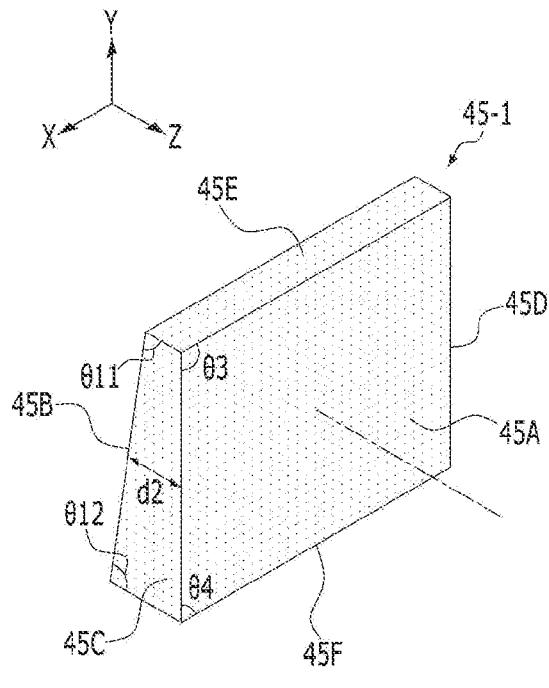
FIGS. 14A and 14B illustrate perspective views FIG. 14A and FIG. 14B of second prisms according to other embodiments.
Figure 14B:
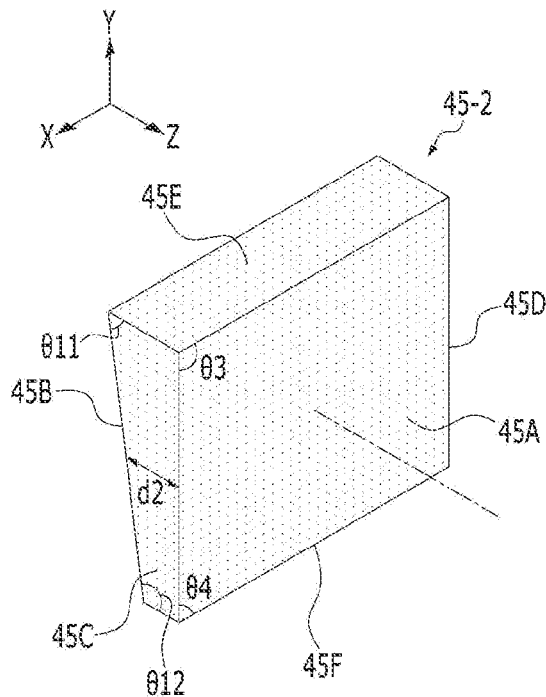

FIGS. 14A and 14B are perspective views of second prisms 45-1 and 45-2 according to other embodiments.

Each of the second prisms 45-1 and 45-2 shown in FIGS. 14A and 14B may include a first surface 45A, a second surface 45B, a first side surface 45C, a second side surface 45D, an upper surface 45E, and a lower surface 45F.

The first surface 45A shown in FIGS. 14A and 14B may be a surface corresponding to the first surface 321 shown in FIGS. 7A and 12, and the second surface 45B shown in FIGS. 14A and 14B may be a surface corresponding to the second surface 322 shown in FIGS. 7A and 12.

The first surface 45A and the second surface 45B may face each other, or may be positioned opposite each other.

The first side surface 45C and the second side surface 45D may face each other or may be positioned opposite each other so as to connect the sides of the first surface 45A to the sides of the second surface 45B.

The upper surface 45E and the lower surface 45F may face each other, or may be positioned opposite each other.

The upper surface 45E may connect the upper side of the first surface 45A to the upper side of the second surface 45B, and the lower surface 45F may connect the lower side of the first surface 45A to the lower side of the second surface 45B.

The first surface 45A and the second surface 45B may not be parallel to each other. Each of the first surface 45A and the second surface 45B may be a flat surface.

Although the upper surface 45E and the lower surface 45F may be parallel to each other, the disclosure is not limited thereto. In another embodiment, the upper surface 45E and the lower surface 45F may not be parallel to each other.

Although the first side surface 45C and the second side surface 45D may be parallel to each other, the disclosure is not limited thereto. In another embodiment, the first side surface 45C and the second side surface 45D may not be parallel to each other.

For example, the included angle θ3 between the first surface 45A and the upper surface 45E may be a right angle, and the included angle θ4 between the first surface 45A and the lower surface 45F may be a right angle.

The included angle θ11 between the second surface 45B and the upper surface 45E of the second prism 45-1 shown in FIG. 14A may be an obtuse angle, and the included angle θ12 between the second surface 45B and the lower surface 45F of the second prism 46-1 shown in FIG. 14A may be an acute angle.

Meanwhile, the included angle θ11 between the second surface 45B and the upper surface 45E of the second prism 45-2 shown in FIG. 14B may be an acute angle, and the included angle θ12 between the second surface 45B and the lower surface 45F of the second prism 45-2 shown in FIG. 14B may be an obtuse angle.

The length d2 of each of the second prisms 45-1 and 45-2 in the direction of the optical axis OA (in the Z-axial direction) may be less than the length d1 of the first prism 310 in the direction of the optical axis OS (in the Z-axial direction) (d2<d1).

The length d2 of each of the second prisms 45-1 and 45-2 in the direction of the optical axis OA (in the Z-axial direction) may be the maximum length between the first surface 45A and the second surface 45B of each of the second prisms 45-1 and 45-2.

For example, in FIG. 14A, d2 may be the distance between the corner at which the first surface 45A meets the lower surface 45F and the corner at which the second surface 45B meets the lower surface 45F. Meanwhile, in FIG. 14B, d2 may be the distance between the corner at which the first surface 45A meets the upper surface 45E and the corner at which the second surface 45B meets the upper surface 45E.

FIGS. 15A-15D are cross-sectional views of second prisms 45-3 to 45-6 according to other embodiments, taken along line A-B in FIG. 7A.

Each of the second prisms 45-3 to 45-6 shown in FIGS. 15A-15D may include a first surface 45A1, 45A2, 45A3 or 45A4, a second surface 45B1, 45B2, 45B3 or 45B4, a side surface 45C, a second side surface 45D, an upper surface 45E, and a lower surface 45F.

Figure 15A:
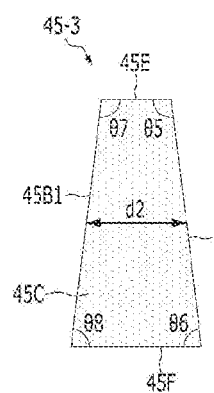
FIGS. 15A-15D illustrate cross-sectional views FIGS. 15A to 15D of second prisms according to other embodiments, taken along line A-B in FIG. 7A.
Figure 15B:
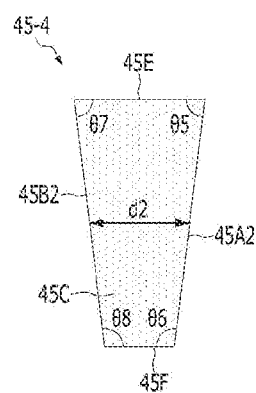

Each of the first surface 45A1 or 45A2 and the second surface 45B1 or 45B2 of the second prism 45-3 or 45-4 shown in FIGS. 15A and 15B may be a flat surface, and the first surface 45A1 and the second surface 45B1 may not be parallel to each other.

The included angle θ5 or θ6 between one of the upper surface 45E and the lower surface 45F and the first surface 45A1 or 45A2 may be an acute angle, and the included angle θ6 or θ5 between the other of the upper surface 45E and the lower surface 45F and the first surface 45A1 or 45A2 may be an obtuse angle.

Furthermore, the included angle θ7 or θ8 between one of the upper surface 45E and the lower surface 45F and the second surface 45B1 or 45B2 may be an acute angle, and the included angle θ8 or θ7 between the other of the upper surface 45E and the lower surface 45F and the second surface 45B1 or 45B2 may be an obtuse angle. For example, each of the included angles θ6 to θ8 may not be a right angle.

Figure 15C:
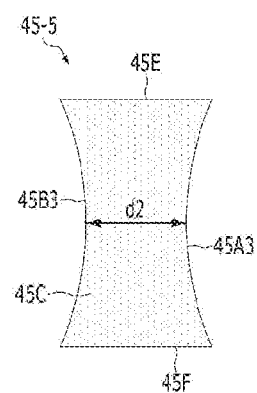

The second prism 45-5 shown in FIG. 15C may have the form of a concave lens. For example, the first surface 45A3 and the second surface 45B3 of the second prism 45-5 shown in FIG. 15C may be curved surfaces, which are concave in opposite directions. For example, the first surface 45A3 may be concave in a direction toward the second surface 45B3 from the first surface 45A3, and the second surface 45B3 may be concave in a direction toward the first surface 45A3 from the second surface 45B3.

Figure 15D:
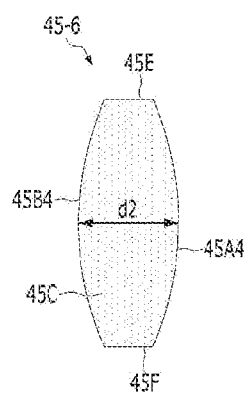

The second prism 45-6 shown in FIG. 15D may have the form of a convex lens. For example, the first surface 45A4 and the second surface 45B4 of the second prism 45-6 shown in FIG. 15D may be curved surfaces that are convex in opposite directions. For example, the first surface 45A4 may be convex in a direction toward the first surface 45A4 from the second surface 45B4, and the second surface 45B4 may be convex in a direction toward the second surface 45B4 from the first surface 45A4.

In each of FIGS. 15A-15D, d2 may be less than the length d1 of the first prism 310 in the direction of the optical axis OA (in the Z-axial direction) (d2<d1). Here, d2 in FIGS. 15A-15D may be the maximum length between the first surfaces 45A1 to 45A4 and the second surfaces 45B1 to 45B4.

Figure 16:
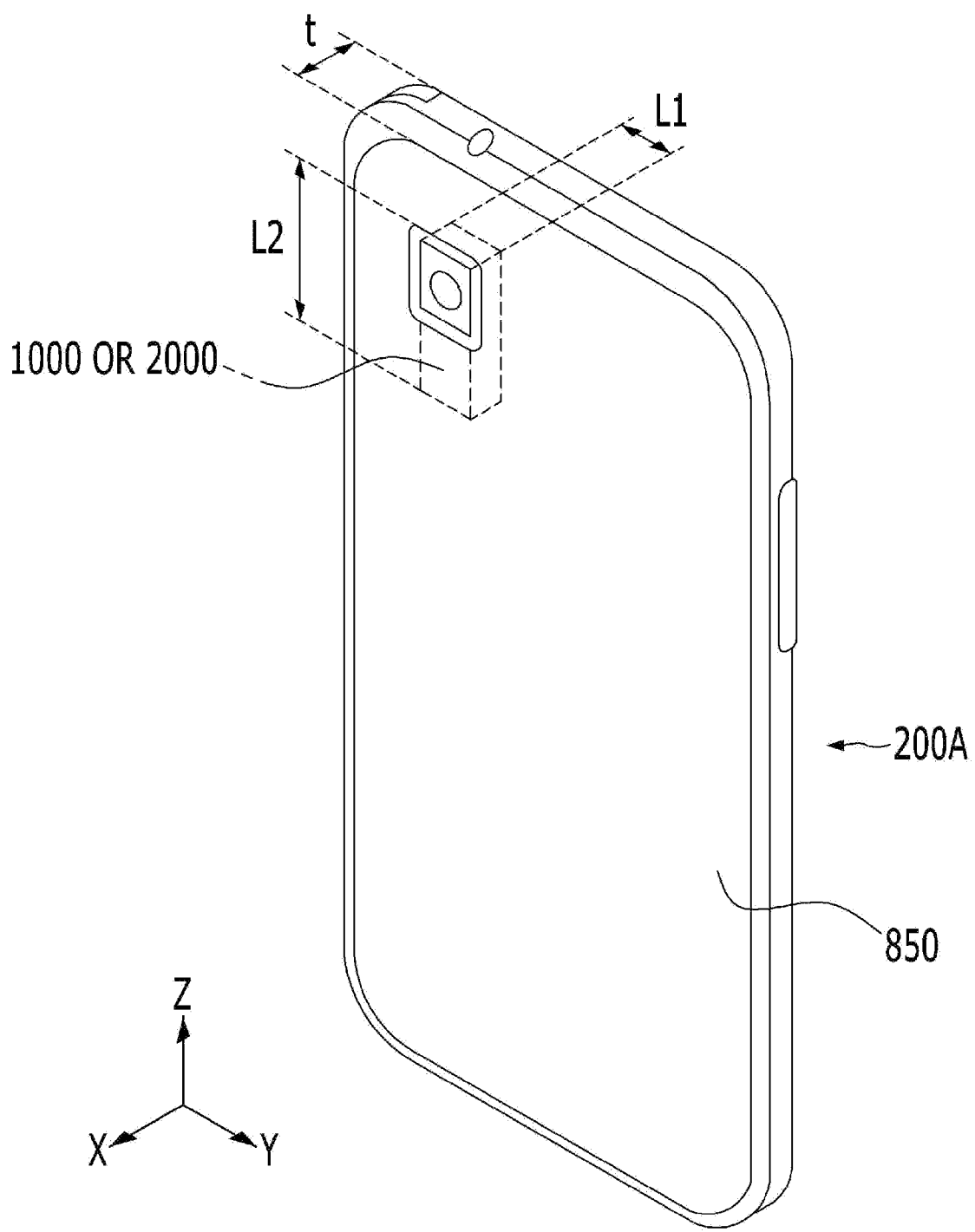
FIG. 16 is a perspective view illustrating a portable terminal according to an embodiment.
Figure 17:
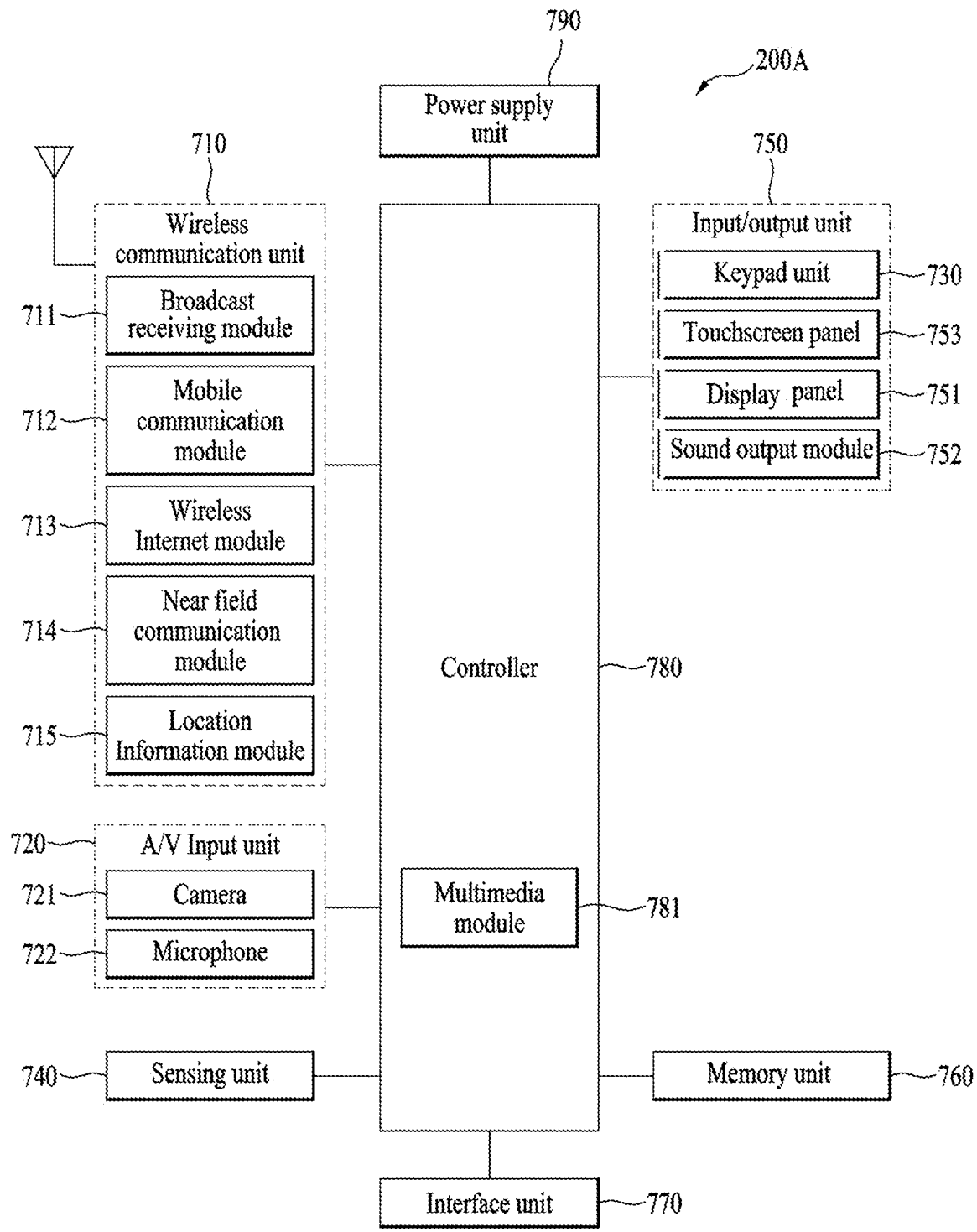
FIG. 17 is a view illustrating the configuration of the portable terminal shown in FIG. 16.

FIG. 16 is a perspective view illustrating a portable terminal 200A according to an embodiment. FIG. 17 is a view illustrating the configuration of the portable terminal 200A illustrated in FIG. 16.

Referring to FIGS. 16 and 17, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 16 has a bar shape, without being limited thereto, and may be any of various types such as, for example, a slide type, a folder type, a swing type, or a swivel type, in which two or more subbodies are coupled so as to be movable relative to each other.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast-receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may include the camera module 1000, 2000 according to the embodiment shown in FIG. 1 or 10.

The sensing unit 740 may sense the current state of the terminal 200A, such as, for example, opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. When the terminal 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device, and the like.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input on a keypad.

The display module 751 may include a plurality of pixels, the color of which varies in response to electrical signals applied thereto. For example, the display module 751 may include at least one among a liquid crystal display, a thin-film-transistor-liquid crystal display, an organic light-emitting diode, a flexible display and a 3D display.

The sound output module 752 may output audio data received from the wireless communication unit 710 in, for example, a call signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for the processing and control of the controller 780 and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the terminal 200A. The interface unit 770 may receive power or data from the external component, and may transmit the same to respective constituent elements inside the terminal 200A, or may transmit data inside the terminal 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port and the like.

The controller 780 may control the overall operation of the terminal 200A. For example, the controller 780 may perform control and processing related to, for example, voice calls, data communication, and video calls.

The controller 780 may include a multimedia module 781 for multimedia playback. The multimedia module 781 may be embodied in the controller 180, or may be embodied separately from the controller 780.

The controller 780 may perform a pattern recognition process capable of recognizing writing input or drawing input carried out on a touch screen as a character and an image, respectively.

The power supply unit 790 may supply power required to operate the respective constituent elements upon receiving external power or internal power under the control of the controller 780.

Referring to FIG. 16, the camera module 1000 may be disposed at the body 850 of the portable terminal 200A such that the incident surface 8A of the first prism 310 is disposed parallel to one surface of the body 850 (for example, the rear surface or the front surface thereof).

Alternatively, the camera module 2000 may be disposed at the body 850 of the portable terminal 200A such that the first surface 321 of the second prism 320-1 is disposed parallel to one surface (for example, the rear surface or the front surface) of the body 850.

In FIG. 16, the first movable unit 100A, the second optical path changer 10B, and the first optical path changer 10A may be disposed in that order in a direction toward the lower surface from the upper surface of the body 850 of the portable terminal 200A. For example, the camera module 2000 may be disposed at the body 850 of the portable terminal 200A such that the optical axis OA of the first movable unit 100A is parallel to a direction toward the lower surface from the upper surface of the body 850 of the portable terminal 200A or the long-axis direction (for example, the Z-axial direction).

In another embodiment, the camera module may be rotated 90 degrees from the orientation shown in FIG. 16. Specifically, the first movable unit 100A, the second optical path changer 10B, and the first optical path changer 10A may be disposed in that order in a direction toward one side surface of the body 850 of the portable terminal 200A from the other side surface. In other words, the camera module 2000 may be disposed at the body 850 of the portable terminal 200A such that the optical axis OA of the first movable unit 100A is parallel to a direction toward one side surface from the other side surface of the body 850 of the portable terminal 200A or the short axial direction (for example, the X-axial direction).

Because the lenses of the lens module 400, the second prism 320, and the first prism 310 are arranged in the direction of the optical axis OA (for example, the Z-axial direction), it is possible to reduce the length L1 of the camera module 1000 in the second axial direction (for example, in the X-axial direction) perpendicular to the optical axis OA. Because L1 is reduced, it is possible to assure a sufficient space sufficient to accommodate therein two or more camera modules in a portable terminal including a dual camera.

Furthermore, because the second prism 320 is a planar prism, it is possible to reduce the length L2 of the camera module 1000 in the optical-axial direction.

In other words, because the embodiment is capable of reducing the lengths L1 and L2 of the camera module, it is possible to reduce spatial restriction when the camera module is mounted to the portable terminal 200A, and it is possible to improve design freedom of the portable terminal.

The features, configurations, effects and the like described above in the embodiments are included in at least one embodiments, but the invention is not limited only to the embodiments. In addition, the features, configuration, effects and the like exemplified in the respective embodiments may be combined with other embodiments or modified by those skilled in the art. Accordingly, content related to these combinations and modifications should be construed as falling within the scope of the embodiments.

INDUSTRIAL APPLICABILITY

Embodiments may be applied to a camera module and an optical device capable of reducing the amount or size of space required to realize an OIS operation.

The invention claimed is:

1. A camera module comprising:
    a lens module;
    a first optical path changer comprising an incident surface and an emitting surface and configured to reflect light introduced through the incident surface toward the emitting surface; and
    a second optical path changer comprising a first surface facing the emitting surface in an optical-axial direction of the lens module and a second surface disposed opposite the first surface,
    wherein the first optical path changer is tilted or rotated with respect to a first axis perpendicular to the optical-axial direction in order to change a path of the light emitted from the emitting surface, and
    wherein the second optical path changer is tilted or rotated with respect to a second axis, which is perpendicular both to the optical-axial direction and to the first axis, in order to change a path of the light emitted from the second surface.

2. The camera module according to claim 1, wherein the first surface and the second surface are parallel to each other.

3. The camera module according to claim 1, wherein the first optical path changer comprises a first prism having the incident surface, a reflection surface, and the emitting surface, and the second optical path changer comprises a second prism having the first surface and the second surface, wherein the second prism is a planar prism.

4. The camera module according to claim 3, wherein a length of the second prism between the first surface and the second surface is less than a length of the incident surface of the first prism in the optical-axial direction.

5. The camera module according to claim 3, wherein the first surface and the second surface are not parallel to each other.

6. The camera module according to claim 5, wherein a maximum length of the second prism between the first surface and the second surface is less than a length of the incident surface of the first prism in the optical-axial direction.

7. The camera module according to claim 1, wherein the lens module, the second optical path changer, and the first optical path changer are arranged in the optical-axial direction.

8. The camera module according to claim 1, wherein the first optical path changer comprises:
    a first housing;
    a first holder disposed in the first housing;
    a first prism, which is disposed in the first holder and includes the incident surface and the emitting surface;
    a first coil disposed at one of the first housing and the first holder; and
    a first magnet disposed at a remaining one of the first housing and the first holder so as to correspond to the first coil,
    wherein the first holder is tilted or rotated with respect to the first axis by interaction between the first coil and the first magnet.

9. The camera module according to claim 8, wherein the second optical path changer comprises:
    a second housing;
    a second holder disposed in the second housing;
    a second prism, which is disposed in the second holder and includes the first surface and the second surface;
    a second coil disposed at one of the second housing and the second holder; and a second magnet disposed at a remaining one of the second housing and the second holder so as to correspond to the second coil,
wherein the second holder is tilted or rotated with respect to the second axis by interaction between the second coil and the second magnet.

10. The camera module according to claim 9, wherein the first housing and the second housing are integrally formed.

11. The camera module according to claim 1, wherein the lens module comprises a plurality of lenses, and the lens module is configured to move in the optical-axial direction.

12. The camera module according to claim 9, comprising:
a first elastic member coupled to the first holder and the first housing;
a second elastic member coupled to the second holder and the second housing;
an image sensor configured to receive a light emitting from the lens module; and
a circuit board conductively connected to the first coil and the second coil.

13. The camera module according to claim 3, wherein the second prism comprises an upper surface disposed between the first surface and the second surface, a lower surface disposed opposite the upper surface, and two side surfaces disposed between the upper surface and the lower surface so as to be opposite each other.

14. A camera module comprising:
a lens module;
a first prism comprising an incident surface, a reflection surface configured to reflect the light introduced through the incident surface, and an emitting surface configured to emit the light reflected by the reflection surface; and
a second prism comprising a first surface through which the light emitted from the emitting surface introduced, and a second surface configured to emit the light introduced through the first surface,
wherein the first prism, the second prism, and the lens module are sequentially arranged in an optical-axial direction, and
wherein the first prism is tilted or rotated with respect to a first axis perpendicular to the optical-axial direction, and the second prism is tilted or rotated with respect to a second axis perpendicular both to the optical-axial direction and to the first axis.

15. The camera module according to claim 14, wherein the first surface and the second surface are parallel to each other.

16. The camera module according to claim 14, wherein a maximum length of the second prism between the first surface and the second surface is less than a length of the incident surface of the first prism in the optical-axial direction.

17. The camera module according to claim 14, wherein the first prism is a right angle prism, and the second prism is a planar prism.

18. The camera module according to claim 14, wherein the first surface and the second surface are not parallel to each other.

19. The camera module according to claim 14, wherein an optical axis in the optical axis direction is a Z-axis and the first axis is an X-axis and the second axis is a Y-axis.

20. A camera module comprising:
a first optical path changer comprising a first surface into which light is introduced and a second surface emitting the light introduced through the first surface and disposed opposite the first surface;
a second optical path changer comprising an incident surface and an emitting surface, the second optical path changer configured to reflect the light introduced into the incident surface from the second surface toward the emitting surface; and
a lens module,
wherein the first optical path changer is rotated or tilted with respect to a first axis parallel to the optical-axial direction of the lens module,
wherein the first surface, the second surface, and the incident surface overlap one another in a second axis perpendicular to the optical-axial direction, and
wherein the second optical path changer is rotated or tilted with respect to a third axis perpendicular both to the first axis and to the second axis.

* * * * *